US009046241B2

(12) United States Patent
Xi

(10) Patent No.: US 9,046,241 B2
(45) Date of Patent: Jun. 2, 2015

(54) HIGH EFFICIENCY DIRECTIONAL LIGHT SOURCE USING LENS OPTICS

(76) Inventor: Jingqun Xi, Lexington, MA (US)

(\*) Notice: Subject to any disclaimer, the term of this patent is extended or adjusted under 35 U.S.C. 154(b) by 269 days.

(21) Appl. No.: 13/478,126

(22) Filed: May 23, 2012

(65) Prior Publication Data

US 2013/0121004 A1  May 16, 2013

Related U.S. Application Data

(60) Provisional application No. 61/559,063, filed on Nov. 12, 2011.

(51) Int. Cl.
| | | |
|---|---|---|
| *F21V 13/04* | (2006.01) | |
| *G02B 27/30* | (2006.01) | |
| *F21V 5/04* | (2006.01) | |
| *F21V 7/04* | (2006.01) | |
| *F21V 7/08* | (2006.01) | |
| *G02B 17/06* | (2006.01) | |
| *F21W 131/406* | (2006.01) | |
| *F21Y 101/02* | (2006.01) | |
| *F21Y 105/00* | (2006.01) | |

(52) U.S. Cl.
CPC . *F21V 5/04* (2013.01); *F21V 7/041* (2013.01); *F21V 7/08* (2013.01); *G02B 17/0673* (2013.01); *F21W 2131/406* (2013.01); *F21Y 2101/02* (2013.01); *F21Y 2105/001* (2013.01)

(58) Field of Classification Search
USPC ............ 362/305, 309, 328, 346, 545; 353/84, 353/31
See application file for complete search history.

(56) References Cited

U.S. PATENT DOCUMENTS

| | | | |
|---|---|---|---|
| 929,795 | A | 8/1909 | Siedentopf |
| 2,254,962 | A | 9/1942 | Harris et al. |
| 4,180,755 | A | 12/1979 | Nixon |
| 4,418,379 | A | 11/1983 | De Marsh |
| 5,114,513 | A | 5/1992 | Hosokawa et al. |
| 5,151,718 | A | 9/1992 | Nelson |
| 5,315,490 | A | 5/1994 | Bastable |
| 5,667,297 | A | 9/1997 | Maassen |
| 5,813,753 | A | 9/1998 | Vriens et al. |
| 6,185,051 | B1 | 2/2001 | Chen et al. |
| 6,229,160 | B1 | 5/2001 | Krames et al. |
| 6,271,622 | B1 | 8/2001 | Coushaine et al. |
| 6,323,063 | B2 | 11/2001 | Krames et al. |
| 6,350,041 | B1 | 2/2002 | Tarsa et al. |
| 6,351,069 | B1 | 2/2002 | Lowery et al. |

(Continued)

OTHER PUBLICATIONS

10w LED Flood Lights FL40021, shown on a web page from website www.lighteveryday.com visited on May 21, 2012 (2 pgs, color).

*Primary Examiner* — Elmito Breval

(57) ABSTRACT

At least one embodiment in the disclosure describes a high efficiency directional light engine. The light engine comprises a light emitter emitting light and a collimation lens. The collimation lens has a cone-shaped sidewall, a base surface and a curved top surface. The height of the cone-shaped sidewall is at least three times more than the diameter of the base surface. The light emitter is optically coupled to and disposed in close proximity to the base surface. One or more first reflection images of the light emitter result from first reflection of the light off a surface of the cone-shaped sidewall. The diameter of the light emitter is substantially close to the diameter of the base surface so that the light emitter and the first reflection images form a virtual point light source with minimal gap(s) or without any gap between the light emitter and the first reflection images.

26 Claims, 37 Drawing Sheets

(56) References Cited

U.S. PATENT DOCUMENTS

| | | |
|---|---|---|
| 6,547,416 B2 | 4/2003 | Pashley et al. |
| 6,547,423 B2 | 4/2003 | Marshall et al. |
| 6,639,733 B2 | 10/2003 | Minano et al. |
| 6,827,467 B2 | 12/2004 | Tenmyo |
| 6,827,475 B2 | 12/2004 | Vetorino et al. |
| 6,896,381 B2 | 5/2005 | Benitez et al. |
| 7,112,916 B2 | 9/2006 | Goh et al. |
| 7,152,985 B2 | 12/2006 | Benitez et al. |
| 7,345,824 B2 | 3/2008 | Lubat et al. |
| 7,405,093 B2 | 7/2008 | Andrews |
| 7,474,816 B2 | 1/2009 | Payne |
| 7,772,604 B2 | 8/2010 | Duong et al. |
| 7,789,531 B2 | 9/2010 | Duong et al. |
| 7,829,358 B2 | 11/2010 | Duong et al. |
| 7,874,703 B2 | 1/2011 | Shastry et al. |
| 7,950,830 B2 | 5/2011 | Kosters |
| 7,968,896 B2 | 6/2011 | Duong et al. |
| 8,118,451 B2 | 2/2012 | Householder et al. |
| 2002/0017844 A1 | 2/2002 | Parkyn et al. |
| 2002/0080615 A1 | 6/2002 | Marshall et al. |
| 2002/0080622 A1 | 6/2002 | Pashley et al. |
| 2002/0141006 A1 | 10/2002 | Pocius et al. |
| 2004/0046489 A1 | 3/2004 | Vetorino et al. |
| 2004/0079957 A1 | 4/2004 | Andrews et al. |
| 2004/0114393 A1 | 6/2004 | Galli |
| 2004/0120153 A1 | 6/2004 | Pate |
| 2004/0126913 A1 | 7/2004 | Loh |
| 2004/0155565 A1 | 8/2004 | Holder et al. |
| 2004/0201978 A1 | 10/2004 | Kuo |
| 2004/0232825 A1 | 11/2004 | Sorg |
| 2005/0001230 A1 | 1/2005 | Takekuma |
| 2005/0073840 A1 | 4/2005 | Chou et al. |
| 2005/0073849 A1 | 4/2005 | Rhoads et al. |
| 2005/0135096 A1* | 6/2005 | Kittelmann et al. .......... 362/241 |
| 2005/0168986 A1 | 8/2005 | Wegner |
| 2007/0152230 A1 | 7/2007 | Duong et al. |
| 2007/0247856 A1 | 10/2007 | Wang et al. |
| 2007/0285192 A1* | 12/2007 | Takahashi .................. 333/197 |
| 2008/0080166 A1 | 4/2008 | Duong et al. |
| 2008/0081531 A1 | 4/2008 | Duong et al. |
| 2009/0275157 A1 | 11/2009 | Winberg et al. |
| 2009/0275266 A1 | 11/2009 | Winberg et al. |
| 2009/0289263 A1 | 11/2009 | Duong et al. |
| 2010/0025655 A1 | 2/2010 | Duong et al. |
| 2010/0066941 A1 | 3/2010 | Duong et al. |
| 2010/0148193 A1 | 6/2010 | Duong et al. |
| 2010/0201611 A1 | 8/2010 | Duong et al. |
| 2011/0032729 A1 | 2/2011 | Duong et al. |
| 2011/0044022 A1 | 2/2011 | Ko et al. |
| 2011/0062470 A1 | 3/2011 | Binrhuizen et al. |
| 2011/0228555 A1 | 9/2011 | Van Gorkon et al. |

* cited by examiner

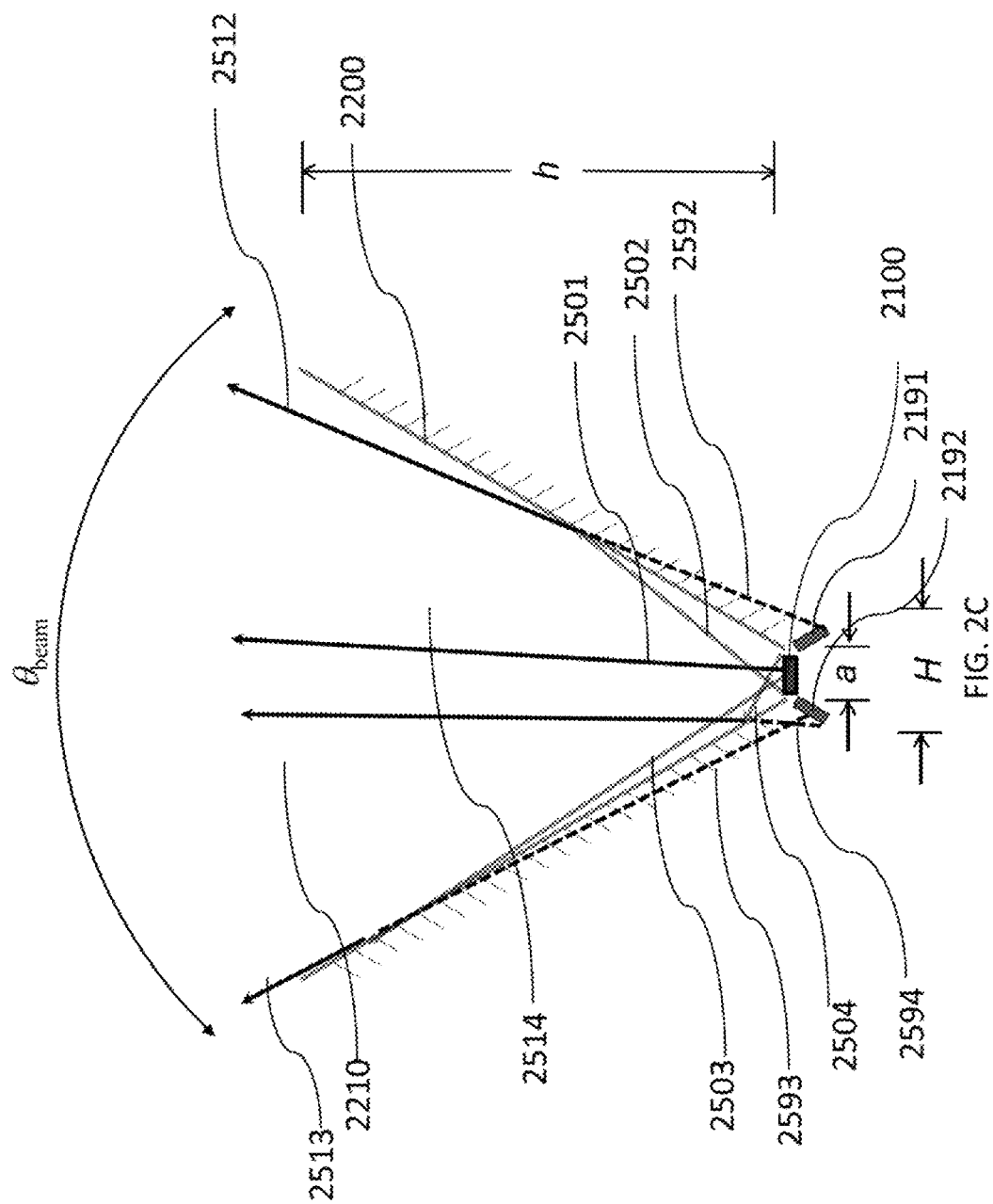

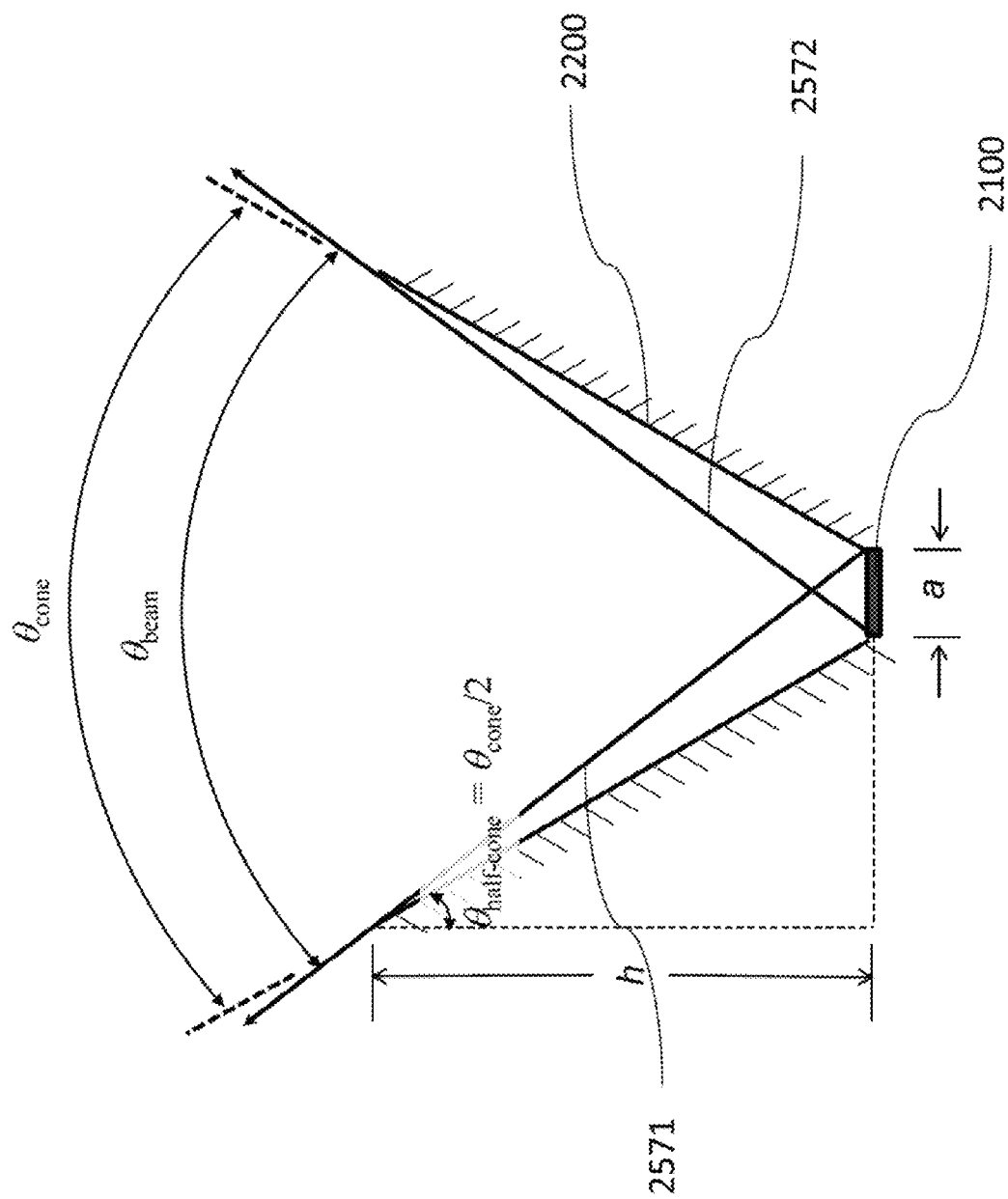

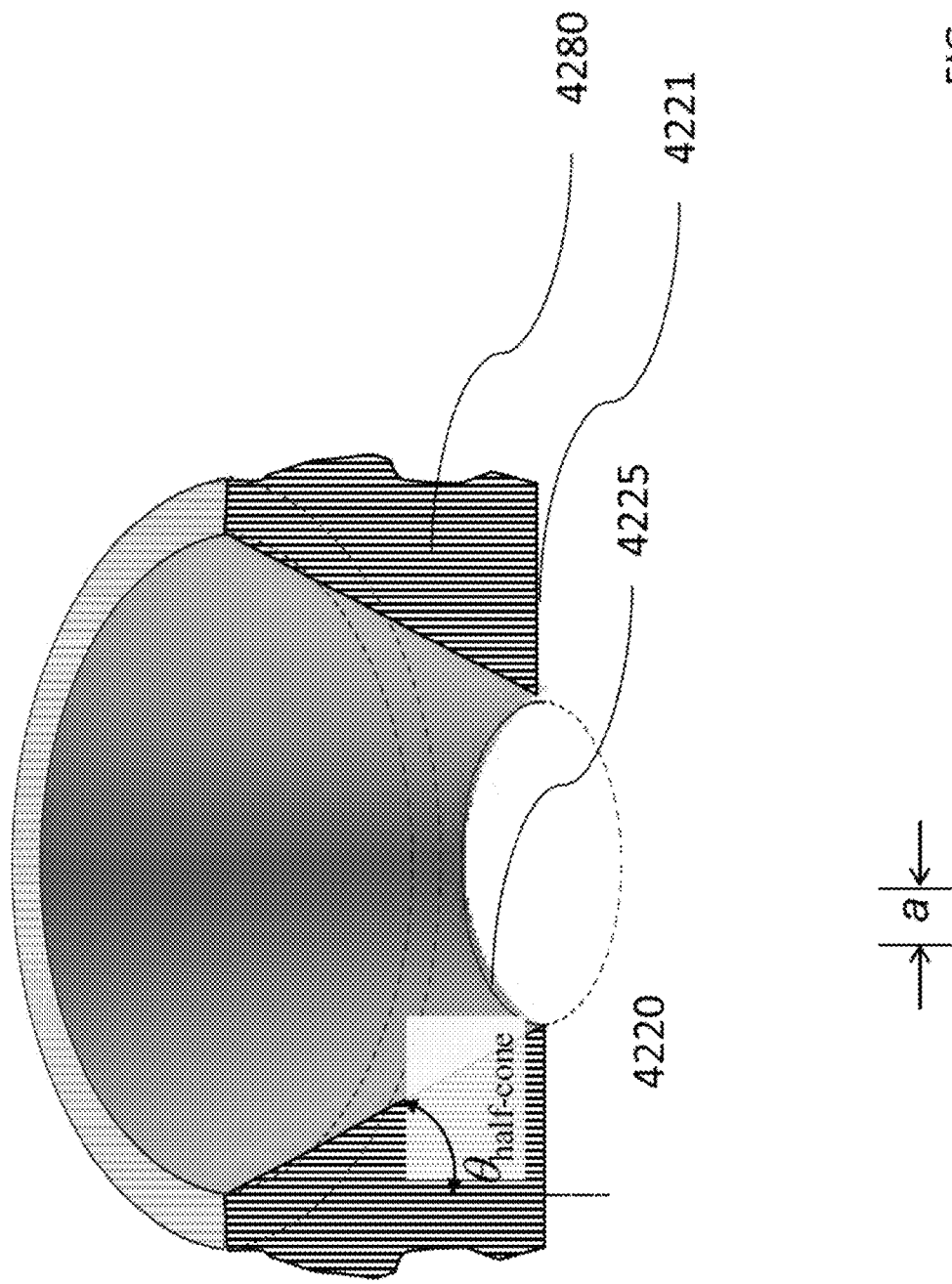

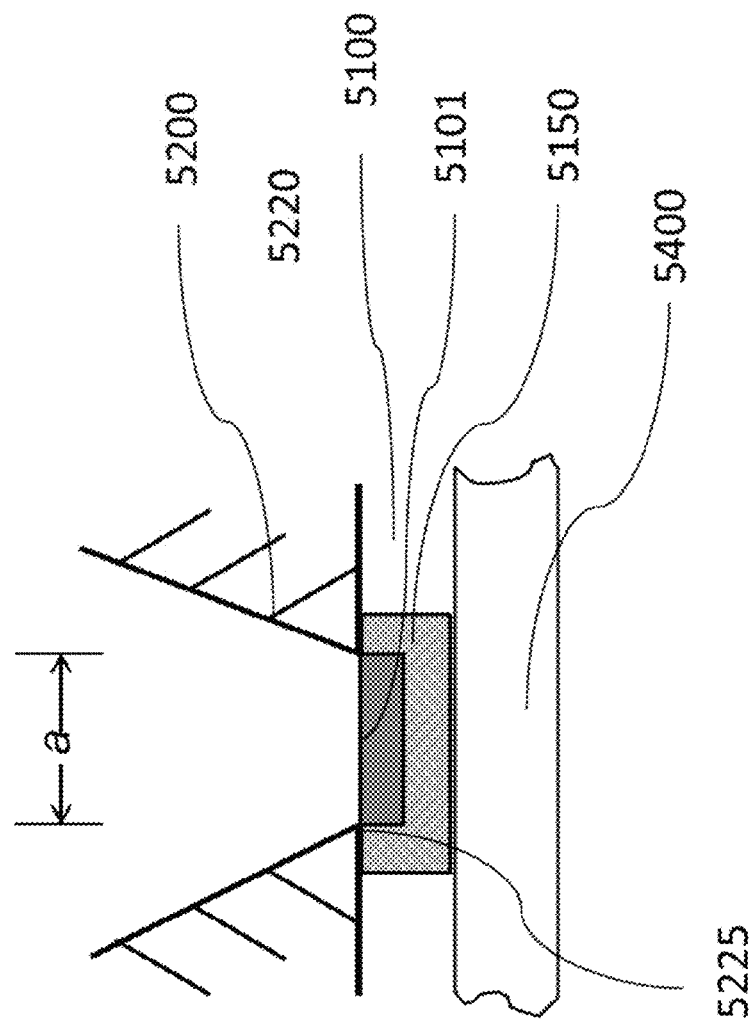

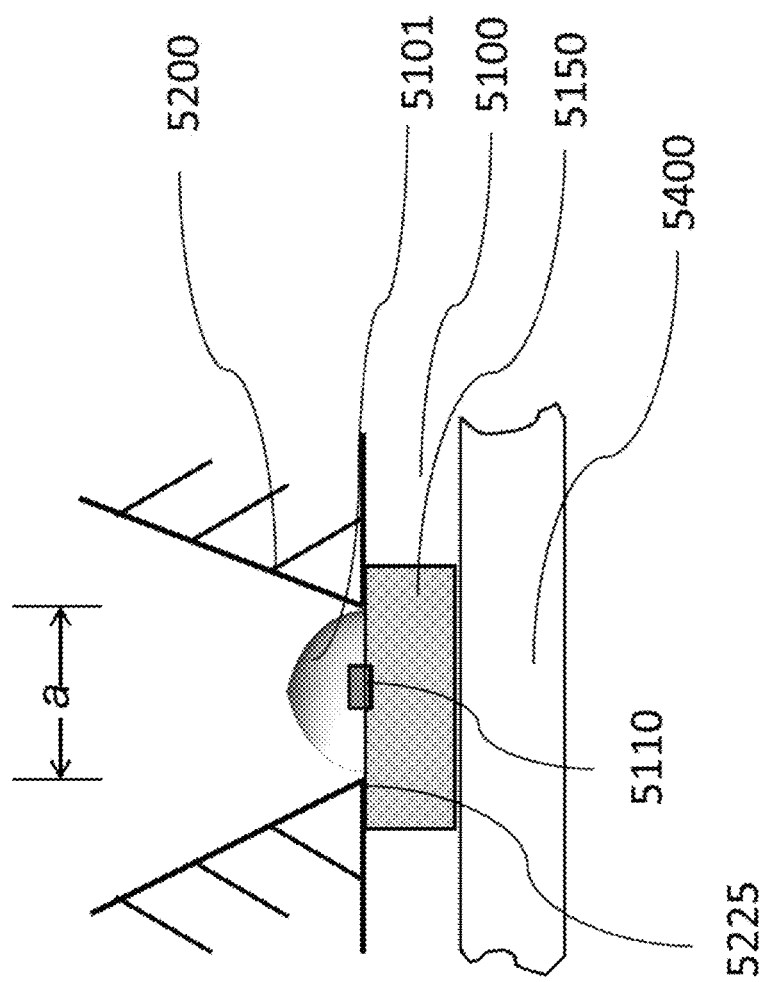

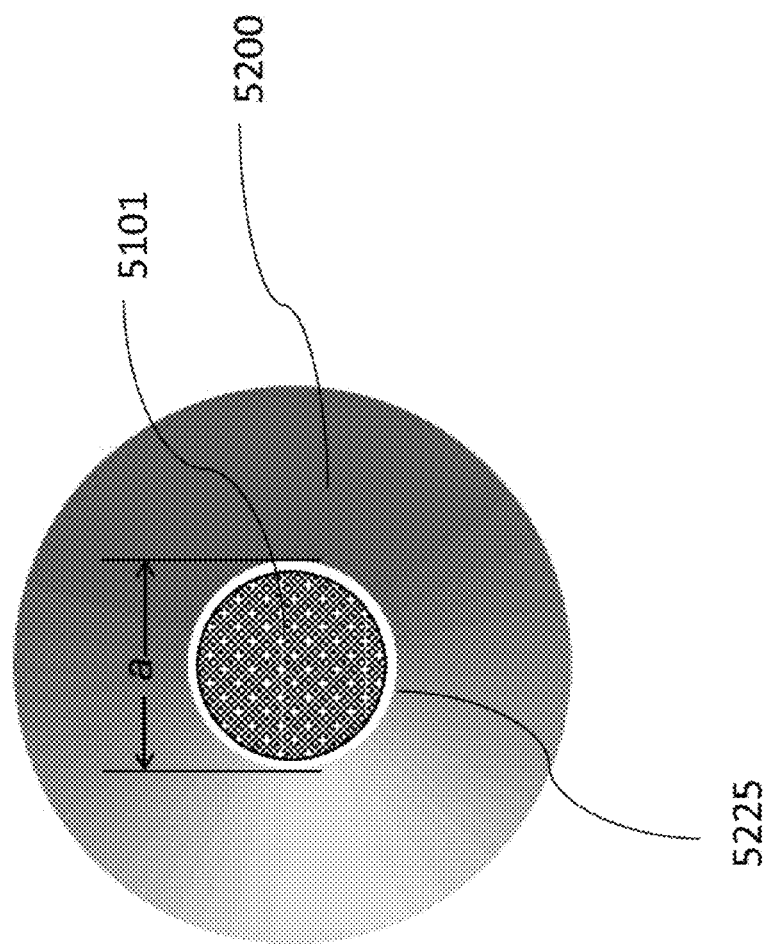

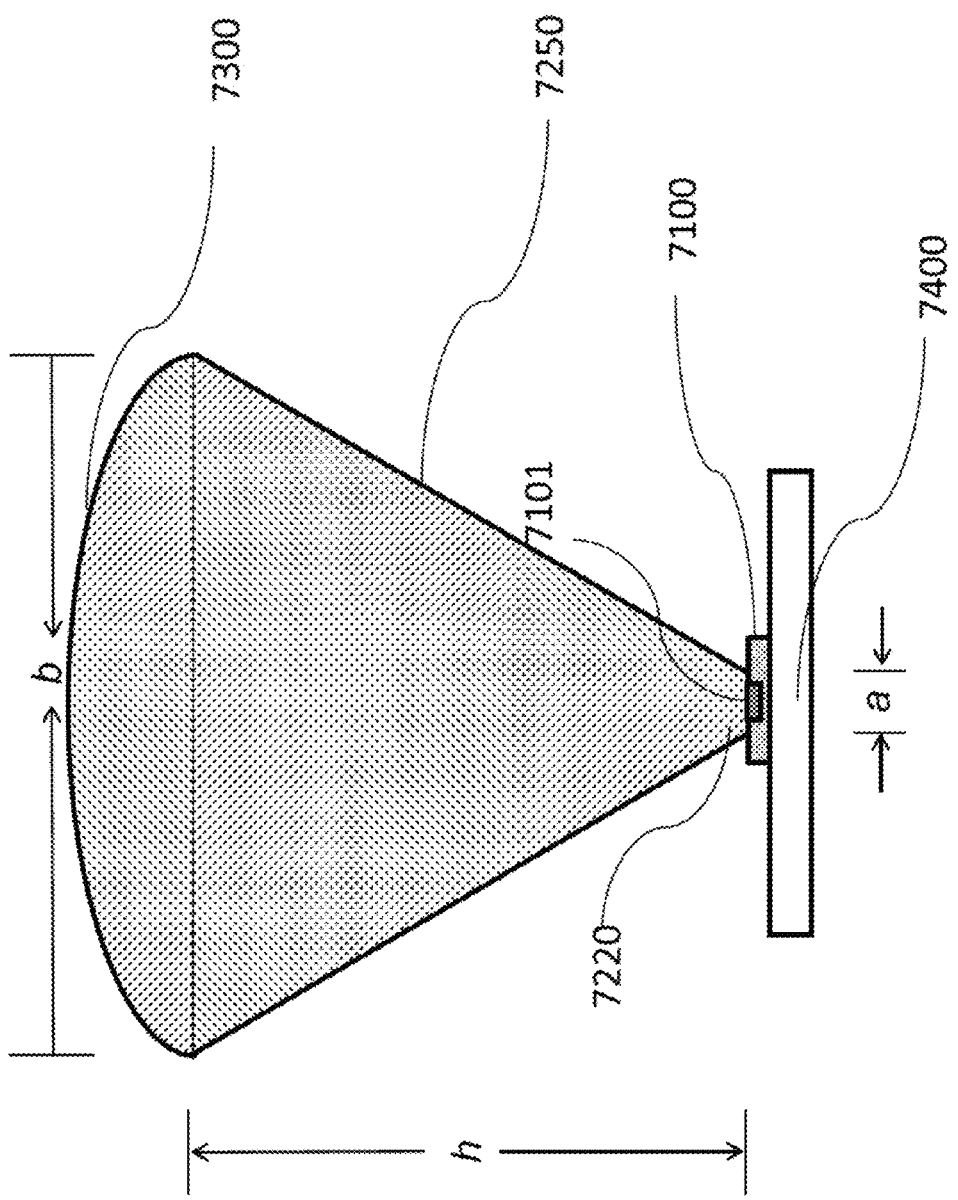

US 9,046,241 B2

HIGH EFFICIENCY DIRECTIONAL LIGHT SOURCE USING LENS OPTICS

RELATED APPLICATIONS

This application claims the benefit of U.S. Provisional Application No. 61/559,063, filed on Nov. 12, 2011, which is incorporated herein by reference.

TECHNICAL FIELD

This invention relates to optical devices. In particular, this invention relates to an optical device to achieve directional light output with a small optical beam divergence angle.

BACKGROUND

Lasers can be directional light sources. However, a laser is a coherent light source, which is not suitable for general illumination applications due to its speckle property and single wavelength characteristics. Incoherent light is usually not directional and the light output has a very large angular dispersion. There are different approaches to achieve directional incoherent light sources with directional light output. One simple way is to use a focusing lens to convert light from a point-like light source, such as an LED, into a directional light beam. So far, most of the collimated light sources on the market are achieved using this approach. However, such an approach cuts off side emission from the emitter, which dramatically lowers the light intensity of the directional light output. There are also approaches using non-imaging optics to achieve directional light output, such as parabolic mirrors, mirrors with special curvatures, etc. However, to achieve a small light output beam angle, the mirror used in these approaches is of substantial size compared to the size of the light emitter. Additionally, these approaches present mirrors surface fabrication challenges, increasing the final product cost.

SUMMARY

At least one embodiment of the present invention discloses a new design and the fabrication method to make a high brightness, high efficiency directional light source, which has directional light output with controllable small beam divergence angle. Directional light source with small beam divergence is desired in many applications, including light engines for projectors, stage spotlighting, long distance illumination, etc. Such directional light source can be fabricated using LEDs or other proper light emitters.

In one embodiment, such directional light source is realized by integrating a light emitter having a small light output surface area, a cone-shaped mirror (also referred to as cone mirror) with a half-cone angle of no smaller than about 30°, and a focusing optical device, such as a collimation lens. The light emitted from the light emitter enters and is collected by the cone mirror to form a directional light emission pattern with a beam angle very close to the cone angle. The focusing optical lens, then, is used to convert all of the light collected by cone mirror into a directional optical beam with desired small beam angle. Such design enables the collection of all light emitted from the emitter and the optical power loss during the concentration process is minimized. Thus, a high brightness, high efficiency directional light source can be fabricated. Also, the fabrication of such light source is simple and straightforward, which ensures a low-cost manufacture of such directional light source.

In another embodiment, such directional light source is realized by a light engine integrating a light emitter with a collimation lens. The collimation lens has a cone-shaped sidewall, a base surface and a curved top surface. The height of the cone-shaped sidewall is at least three times more than the diameter of the base surface. The light emitter is optically coupled to and disposed in close proximity to the base surface. One or more first reflection images of the light emitter result from first reflection of the light off a surface of the cone-shaped sidewall. The diameter of the light emitter is substantially close to the diameter of the base surface so that the light emitter and the first reflection images form a virtual point light source with minimal gap(s) or without any gap between the light emitter and the first reflection images.

The design enables the fabrication of directional light source using light emitters with small sizes, compared to conventional approaches. That will help to fabricate the directional light sources with small sizes, which are desirable in the market.

BRIEF DESCRIPTION OF THE DRAWINGS

The foregoing and other objects, features and advantages disclosed herein will be apparent from the following description of particular embodiments disclosed herein, as illustrated in the accompanying drawings in which like reference characters refer to the same parts throughout the different views. The drawings are not necessarily to scale, emphasis instead being placed upon illustrating the principles disclosed herein.

FIG. 2C illustrates example reflection images causes by reflection off the cone mirror.

FIG. 2D illustrates a beam angle and a cone angle.

FIG. 4B illustrates a cross-sectional view of a bottom half of the cone mirror.

FIG. 5A illustrates an example of a flat light emitter.

FIG. 5C illustrates an example of a light emitter including a transparent dome lens.

FIG. 5E illustrates an example of a light emitter having a circular emission area.

FIG. 7C illustrates an example of a directional light source including the transparent cone-shaped collimation lens.

DETAILED DESCRIPTION

For a better understanding of the present invention, together with other and further objects, advantages and capabilities thereof, reference is made to the following disclosure and appended claims taken in conjunction with the above-described drawings.

Figure 1:
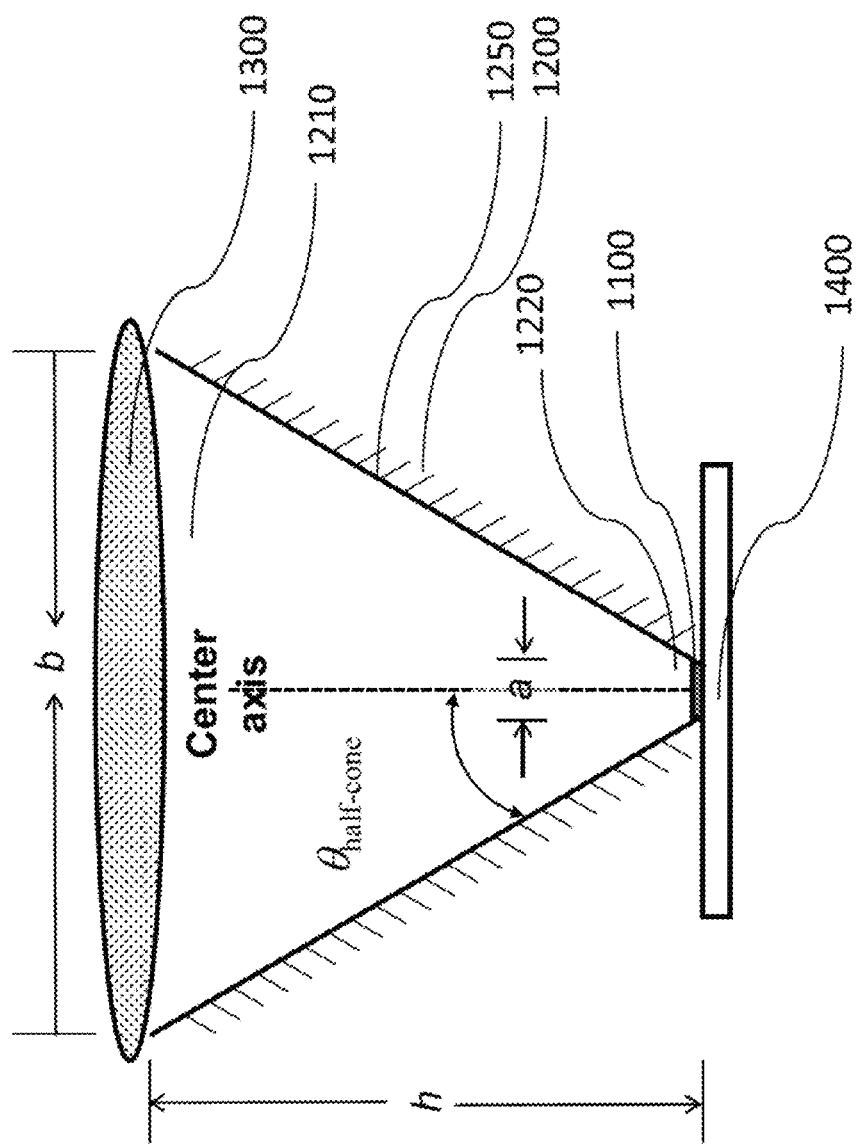
FIG. 1 illustrates an example of a directional light source including a light emitter, a cone mirror and a focusing optical device.

At least one embodiment discloses an optics structure and related optical devices to achieve a directional light source with a small optical beam divergence angle. Such light source can also be called collimated light source or quasi-collimated light source. The schematic drawing of the basic structure for such directional light source is shown in FIG. 1. The light source (also referred to as light engine) includes a light emitter 1100 with small emission area, a cone-shaped mirror (also referred to as cone mirror) 1200 with a base opening 1220 at the bottom. The cone mirror 1200 has a half-cone angle of about 30 degrees. In some embodiments, the half-cone angle is larger than 30 degrees. The light source further includes a focusing optical device 1300. The light emitter 1100 may or may not be mounted on or placed on the supportive base 1400. The light emitter 1100 is placed at the base opening 1220 of the cone mirror 1200. FIG. 1 shows one embodiment of the cone mirror, which has a cone shape with a very small base opening 1220. Its center axis, as shown in FIG. 1, is a line that passes through the center of the base opening 1220 and the top opening 1210. It has a circular shape for its horizontal cross-sections, which are the cross-sections in the planes with the normal directional parallel to the center axis. The cone mirror 1200 has reflective sidewall surface(s) 1250 that face inside. The reflective sidewall surface has a constant sidewall profile slope, which means that the intersection of this cone mirror sidewall with any vertical plane in which the center axis lies in that plane has a sidewall profile with constant profile slope. The sidewall profile slope can be the same or different for each vertical plane that passes through the mirror's central axis as long as the slope has a constant value for each cross-section. The height of the cone mirror 1200, denoted as h, is much larger than the diameter of the base hole 1220, denoted as a. The light emitted from the light emitter 1100 will enter the cone mirror through the hole at the base 1220. The emission surface (also referred to as light output surface) of the light emitter 1100 is located in close proximity to the base opening 1220 of the cone mirror 1200, so that all or most of the light emission from emitter 1100 can enter the cone mirror, or be treated as entering the cone mirror, from the base opening 1220. Also, the dimension of the emission surface of the light emitter 1100 should be the same or close to the dimension of the cone mirror base opening, such as dimension difference is less than 30% of the cone mirror base opening dimension, so that the emission surface of the light emitter 1100 and its image(s) formed by the cone mirror together can form a virtual-point light source with directional light emission. A focusing optical device 1300, such as a collimation lens or curved surface, is placed in front of the top opening 1210 of the cone mirror 1200 to collect and collimate (also referred to as concentrate) all of the light output from the cone mirror opening 1210 into an optical beam with small beam angle. The focusing optical device 1300 may be in contact with or has some distance from the cone mirror 1200.

Figure 2A:
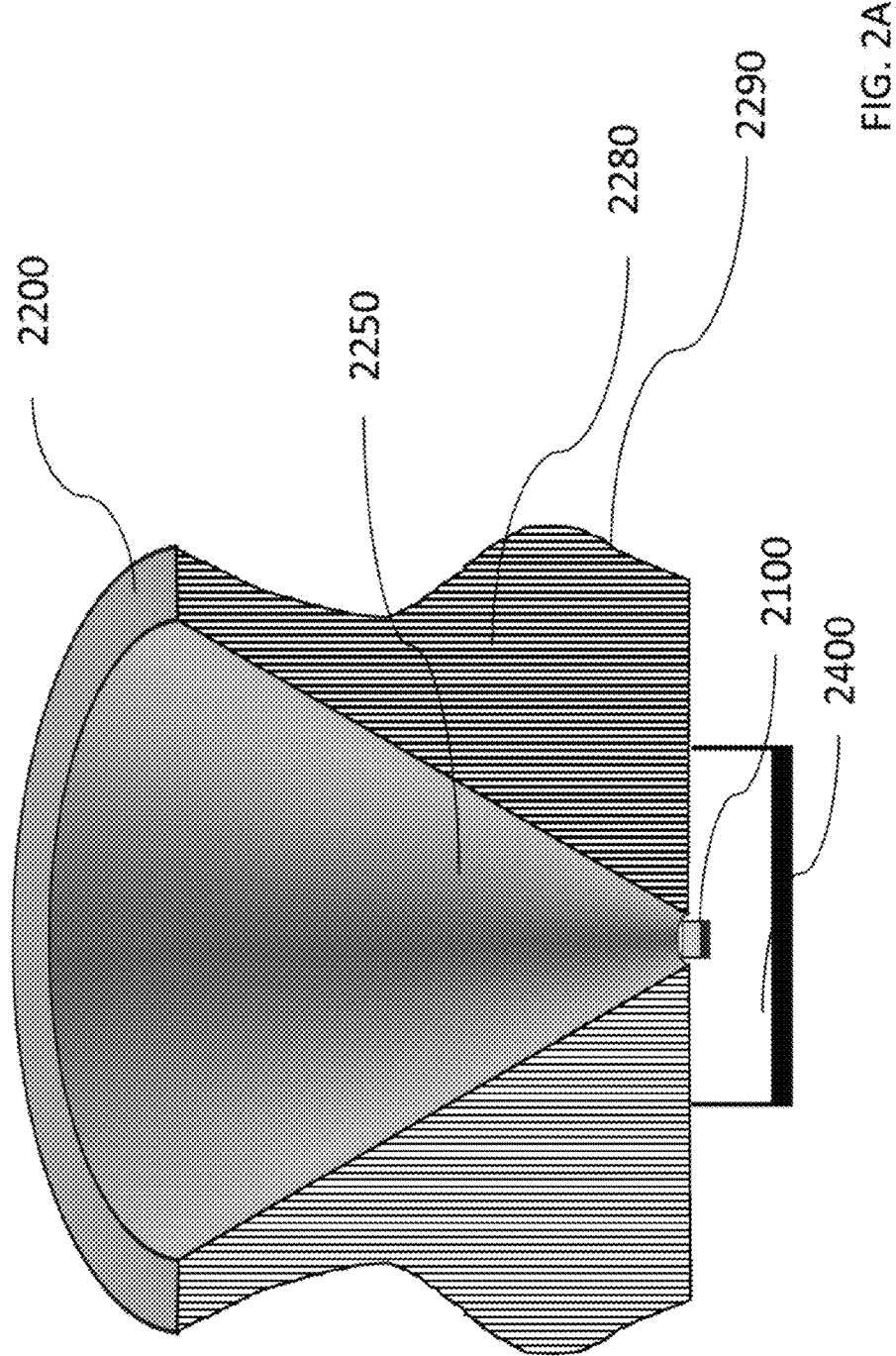
FIG. 2A illustrates a cross-sectional view of a cone mirror with a light emitter at a base opening of the cone mirror.

FIG. 2A shows a 3D drawing of a cone mirror 2200 with a light emitter 2100 at or beneath the cone mirror base opening. Such structure results in a virtual-point source with directional light emission. To clearly illustrate the reflective sidewall surface 2250 of the cone mirror 2200 and the location of the emitter 2100, FIG. 2A shows half of the cone mirror 2200 that cut half along a vertical plane 2280 passing through the center axis of the cone mirror 2200. The light emitter 2100 may or may not be mounted or placed on the supportive base 2400. The outside surface 2290 of the cone mirror can have any profile.

Figure 2B:
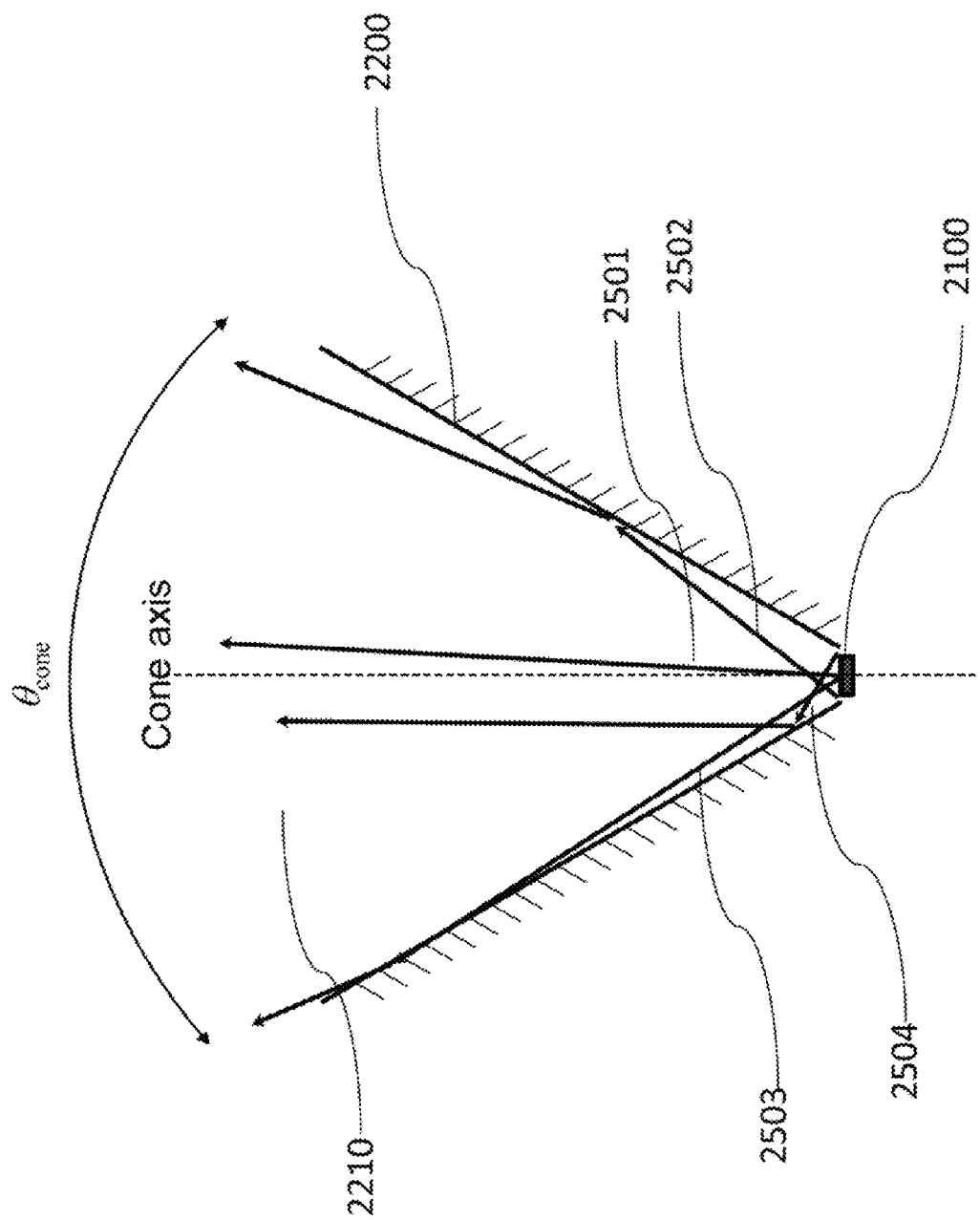
FIG. 2B illustrates example light rays emitted from the light emitter.

The schematic drawings of cone mirror 2200 with light emitter 1100 at the base opening is shown in FIG. 2B. The working principle of light engine can be analyzed using image optics. Assume that the diameter of the emission surface of the emitter 2100 is slightly smaller than the diameter of the base opening of the cone mirror 2200. Light emitter 2100 emits light in different directions. In FIG. 2B, the light beams 2501 emitted from the light emitter 2100, whose original tilting angle off cone mirror axis is smaller than half cone angle, will directly exit the cone mirror's opening 2210 without any reflection from the cone mirror.

The light beams 2502, 2503, 2504 emitted from the light emitter 2100, whose original tilting angles off the cone mirror axis are larger than half cone angle, will be reflected by the cone mirror and change its tilting angle into a value no larger than half cone angle. Because the cone mirror has a half cone angle of about 30° or larger, the light beams 2502, 2503, 2504 are reflected only once by the cone mirror, before the light beams change their tilting angles to values no larger than half cone angle and exit from the cone mirror opening 2210. As a result, no matter what the light emission pattern of the light emitter 2100 has, all of the light beams emitted from emitter 2100 will be confined by the cone mirror 2200 and exit the opening 2210 of the cone mirror with minimized loss.

Using imaging optics, the light beams that are reflected by the cone mirror can be treated as light beams emitted from the reflection image(s) of the light emitter 2100 caused by the cone mirror 2200. FIG. 2C shows such reflection image(s). Light beams 2501, 2502, 2503, 2504 are originally emitted from the light emitter 2100. Beam 2501 exits the cone mirror opening 2210 without any reflection. Beam 2502, 2503, 2504 are reflected once (also referred to as first reflection) by the cone mirror and become the light beams 2512, 2513, 2514, respectively. Light beams 2512, 2513, 2514 can be treated as light beams directly emitted from of the light emitter's image 2191. 2192 formed by the cone mirror, due to the fact that the cone mirror has a straight sidewall profile. In some embodiment, the cone mirror, for example a polyhedral cone, can have a plurality of reflective sidewalls, which can induce a plurality of reflection images. Light beams 2592, 2593, 2594 are the images of light beams 2502, 2503, 2504, respectively, in the cone mirror, as shown in FIG. 2C.

Overall, the light beams that exit the opening of the cone mirror 2210 can be treated as the light beams that are emitted directly from the light emitter 2100 and its reflection image(s) 2191, 2192 in cone mirror 2200. If the diameter of the cone mirror base opening, denoted as a, is substantially close to the effective dimension of light emitter 2100, the light emitter 2100 and its image(s) 2191, 2192 formed by the cone mirror are very close to each other. Therefore, the emitter and images together can be treated as a virtual point-source.

Above disclosures in FIG. 2B and FIG. 2C shows that all of the light beams exiting the cone opening 2210 can be treated as the light beams directly emitted from the point-like source, which consists of light emitter itself 2100, and its image(s) 2191, 2192 formed by the cone mirror. This point-like source has a dimension of H, which may be larger than a. Additionally, all of the light beams emitted from the light emitter 2100 itself and its image(s) 2191, 2192 formed by the cone mirror are confined within a beam angle, which is determined by the cone mirror's cone angle. Therefore, the virtual point-source is a directional virtual-point light source.

In the case that the effective dimension of the light emitter 2100 is substantially the same as the cone mirror base hole, the light emitter itself 2100 and its image(s) 2191, 2192 formed by the cone mirror can form a virtual point-source having a emission area without any gap in between. All of the light emitted from light emitter 2100 will either directly exit the cone mirror opening 2210 or be reflected only once by the cone mirror and exit the opening of the cone mirror 2210. Therefore, one of the advantages of such directional virtual-point light source technology is that the optical loss caused by the cone mirror is minimized. The only optical loss is caused by the one-time mirror reflection. As a result, the total light output from the cone mirror 2200 will be close to the total light emission from the emitter 2100.

The beam angle of the directional virtual-point light source shown in FIG. 2B and FIG. 2C is determined by the dimensions of the cone mirror, as shown in FIG. 2D. The beam angle, $\theta_{beam}$, is determined by the emitted beams 2571, 2572, which are not reflected by the cone mirror and have the largest tilting angle. Therefore, the beam angle, $\theta_{beam}$, is larger than the cone angle, $\theta_{cone}$. The cone mirror's height, h, is much larger than the diameter of the cone mirror base opening, a. As a result, the beam angle is very close to cone angle; $\theta_{beam} \approx \theta_{cone}$. The geometrical relationship in FIG. 2D shows that the beam angle, $\theta_{beam}$, can be calculated by, $$\theta_{beam} = 2 \times \tan^{-1}[(h \times \tan(\theta_{cone}/2) \times a)/h]. \quad (1)$$

For example, if cone angle of the cone mirror is, $\theta_{cone}=60°$, and the ratio between cone mirror height, h, and the cone mirror base opening diameter, a, is h/a=10, the beam angle will be $\theta_{beam}=68.2°$, which is very close to the cone angle, $\theta_{cone}=60°$.

For example, if cone angle of the cone mirror, $\theta_{cone}=60°$, and the ratio between cone mirror height, h, and the cone mirror base diameter, a, is h/a=5, the beam angle will be $\theta_{beam}=75.7°$, which is still not a big difference (25% larger) from cone angle, $\theta_{cone}=60°$. In summary, the beam angle, $\theta_{beam}$, of the directional virtual-point light source is determined by the dimensions of the cone mirror. The higher the ratio between h and a is, the closer the beam angle, $\theta_{beam}$, and cone angle, $\theta_{cone}$ are. With a cone mirror 2200 with high ratio between h and a, the cone mirror 2200 can form a beam angle of the light emission from the emitter 2100 to a value close to the cone angle.

Figure 3A:
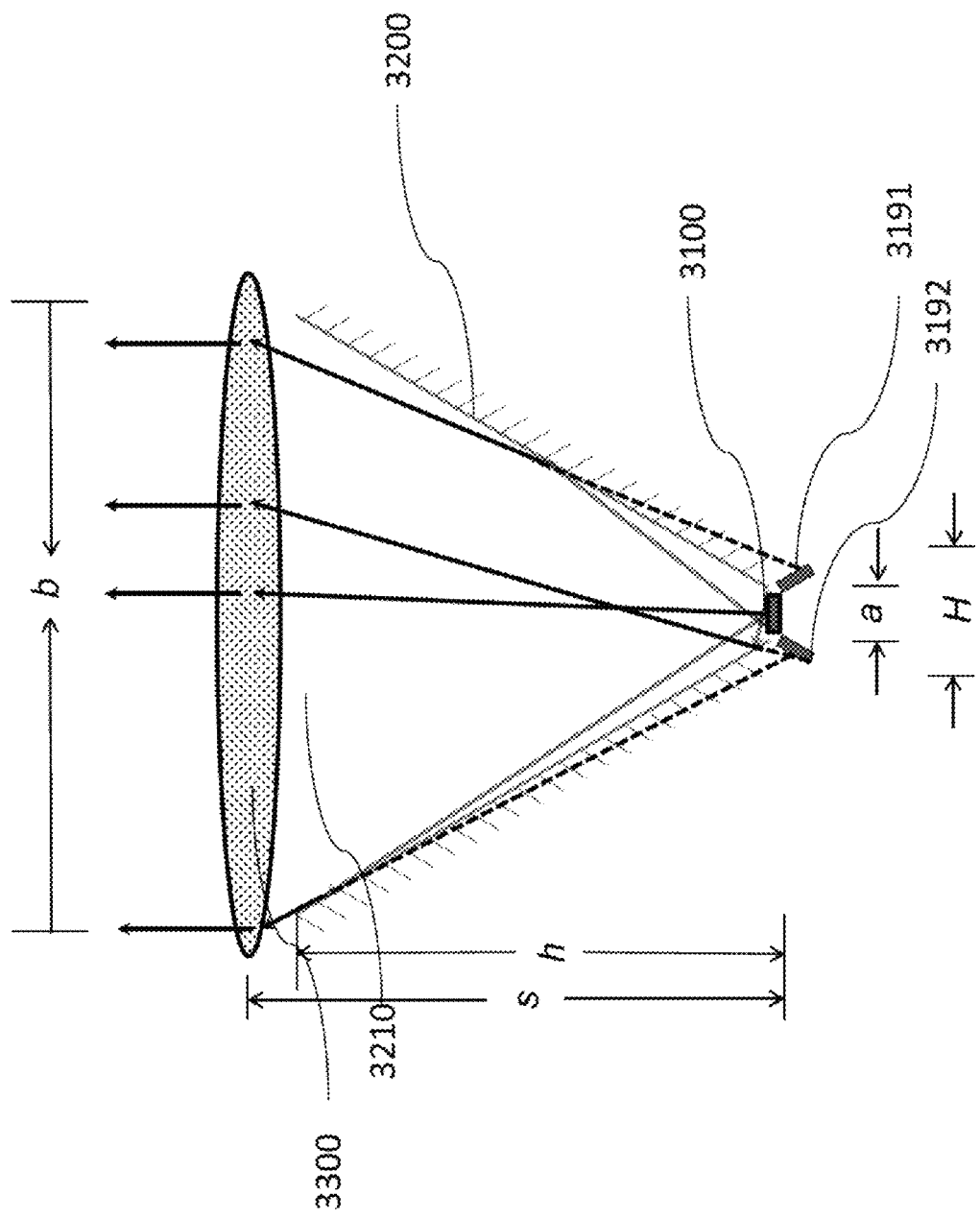
FIG. 3A illustrates an example of a directional light source with a small beam angle.

In one embodiment, a focusing optical device 3300 with proper focal length, for example focusing lens, can be placed on top of the cone mirror top opening 3210, as shown in FIG. 3A, to achieve a directional light source with small beam angle. The focusing optical device 3300 can be in contact with the cone mirror 3200, or be placed at a certain distance from the cone mirror 3200, or be placed inside the cone mirror opening 3210. The focusing optical device 3300 is big enough to collect substantially all of the light output from the cone mirror top opening 3210. For example, if the focusing optical device 3300 is placed on and in contact with the top of the cone mirror opening 3210, the diameter of the focusing optical device 3300 can be the same as or larger than the diameter of cone mirror opening 3210, b. If the focusing optical device 3300 is placed inside cone mirror opening 3210, the focusing optical device 3300 can be placed with its edge in contact with the cone mirror sidewall. If the focusing optical device 3300 is placed on top of cone mirror opening 3210 with some distance from the cone mirror, the diameter of the focusing optical device 3300 is larger than the diameter of the cone mirror opening 3310, b. The diameter is extended to a value that is large enough to collect all of the light output from the cone mirror opening 3210. As a result, the distance between the focusing optical device and the virtual point-source, s, can be equal to, larger than, or smaller than the height of the cone mirror, h.

The focusing optical device 3300 can be any optical device with an optical focusing function. The options of the focusing optical device are, but not limited to, spherical lens, aspheric lens, Fresnel lens, curved surface, or others. To achieve a collimated beam or optical beam with very small beam angle, the focal length of the focusing optical device 3300 should be similar or close to the distance, s, between the focusing optical device 3300 and the virtual-point light source consisting of light emitter 3100 and its image(s) 3191, 3192. In other words, the focal point of the focusing optical device is in close proximity of the virtual-point light source. All of the light beams can be treated as light emitted from the point-like source, which includes light emitter 3100 and its images 3191, 3192 formed by cone mirror. Therefore, the focusing optical device 3300 can convert all of the light beams into a collimated beam, i.e. an optical beam with small beam angle, as shown in FIG. 3A.

The beam angle of the optical beam output from the optical focusing device 3300 is determined by the size of the virtual point-source, H, which consists of light emitter 3100 together with its images 3191, 3192 formed by the cone mirror 3200, and the distance, s, between the focusing device 3300 and the point-like source consisting of light emitter 3100 itself and its image(s) 3191, 3192, and the focal length of the focusing optical device 3300. To have a small beam angle for the light output from the light source, the effective focal length of the focusing optical device 3300 has a value close to the distance, s, so that the focusing optical device 3300 can collimate or concentrate the light emitted from the virtual-point source, which consists of the light emitter 3100 and the its image(s) 3191, 3192, to a beam with very small beam angle. Additionally, the larger the ratio between distance, s, over dimension, H, is, the smaller possible beam angle can be achieved for the optical light output from this directional light source.

Figure 3B:
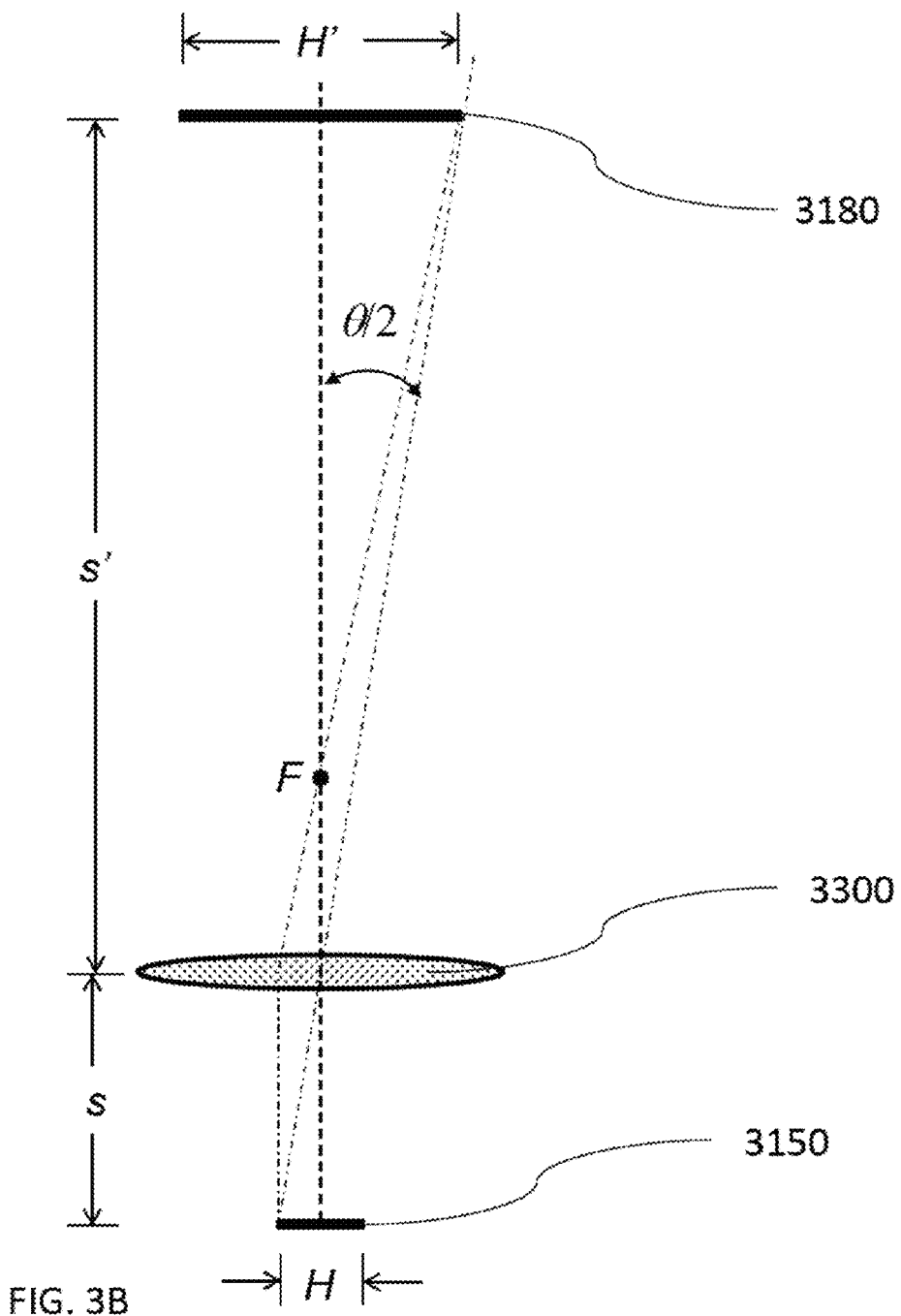
FIG. 3B illustrates the relationship between the beam angle and the dimensions of a cone mirror and a light emitter of the directional light source.

The beam angle of the light output from the directional light source, and its relationship with the dimension of the light emitter 3100 and the cone mirror 3200, and the location of focusing optical device 3300 can be analyzed as shown in FIG. 3B. The dimensions used in FIG. 3B come from the dimension of the light source shown in FIG. 3A. The cone mirror has a base opening with a diameter of a. The effective diameter of the light emitter 3100 is equal to or smaller than the base diameter, a. The diameter of the virtual-point light source 3150, which includes light emitter 3100 and its image (s) 3191, 3192 formed by cone mirror 3200, is H, which is about two time of a if the cone angle is $\theta_{cone}=60°$ for the cone mirror. The effective distance from the virtual point-source 3150 to the optical focusing device 3300, is s. The optical focusing device 3300 works as a projection lens which can project an image of the virtual-point source 3150 with dimension of H, to a plane with a distance of s'. An illuminated spot 3180 with dimension of H' is formed; and hence a directional light beam can be formed. As the projected image 3180 with dimension of H' is focused at a plane that is substantially far away from the light source, or even at infinity distance, the beam angle, θ, of the light output beam from the light source is the smallest possible beam angle, and can be determined by the dimension of this light source, and can be calculated by following, $$\theta=2\times\tan^{-1}[H'/(2s'))]=2\times\tan^{-1}[H/(2s)] \quad (2)$$

Therefore, the smallest beam angle of the light beam output from the light source in the embodiment, is determined by the dimension of the light emitter and the cone mirror. To have a small beam angle, and hence more concentrated light power, the dimension ratio H/s should be small. That means that the cone mirror base diameter is much smaller than distance between the focusing optical device 3300 and the virtual-point source 3150. For example, if the H/s=0.1, a beam angle of about 11.4° can be achieved; if H/s=0.079, a beam angle of about 9.0° can be achieved.

In some embodiments, the focal length of the focusing optical device 3300 is not necessary to match the distance, s. Focusing optical device 3300 with a variety of focal lengths can be used. As a result, a light source with different beam angles can be achieved. In some embodiments, even optical device(s) with negative focal length(s), such as a diverging lens, can be used to achieve a light source with a very large beam angle.

In one embodiment, the focal length of the focusing optical device 3300, and its distance, s, from the virtual point source 3150 can be properly chosen so that the projected image 3180 of the virtual point source 3150 has a reasonable uniformity. Virtual point-source 3150 includes light emitter 3100, and its image(s) 3191, 3192 formed by the cone mirror 3200, as shown in FIG. 3A. There may be gaps between light emitter itself 3100, and its image(s) 3191, 3192. Therefore, there is a possibility that the projected image 3180 of virtual-point source 3150 can have such gaps on the illuminated plane although this gap is very small, if the focusing optical device 3300 is placed at a certain distance, s, so that it can well focus the image of gap features from the virtual point source onto the illuminated area. To achieve a uniform illumination from this directional light source, the focusing optical device 3300 should be placed at a certain distance, s, that the illuminated area should have reasonable uniformity with smooth transition between light emitter's projected image and the projected image of light emitter's image(s) in cone mirror. The dimension of the light emitter and the diameter of the light emitter can be substantially close to each other so that the light output from the directional light source, which includes light emitter, cone mirror and focusing optical device, enables an illumination pattern with good uniformity.

Figure 4A:
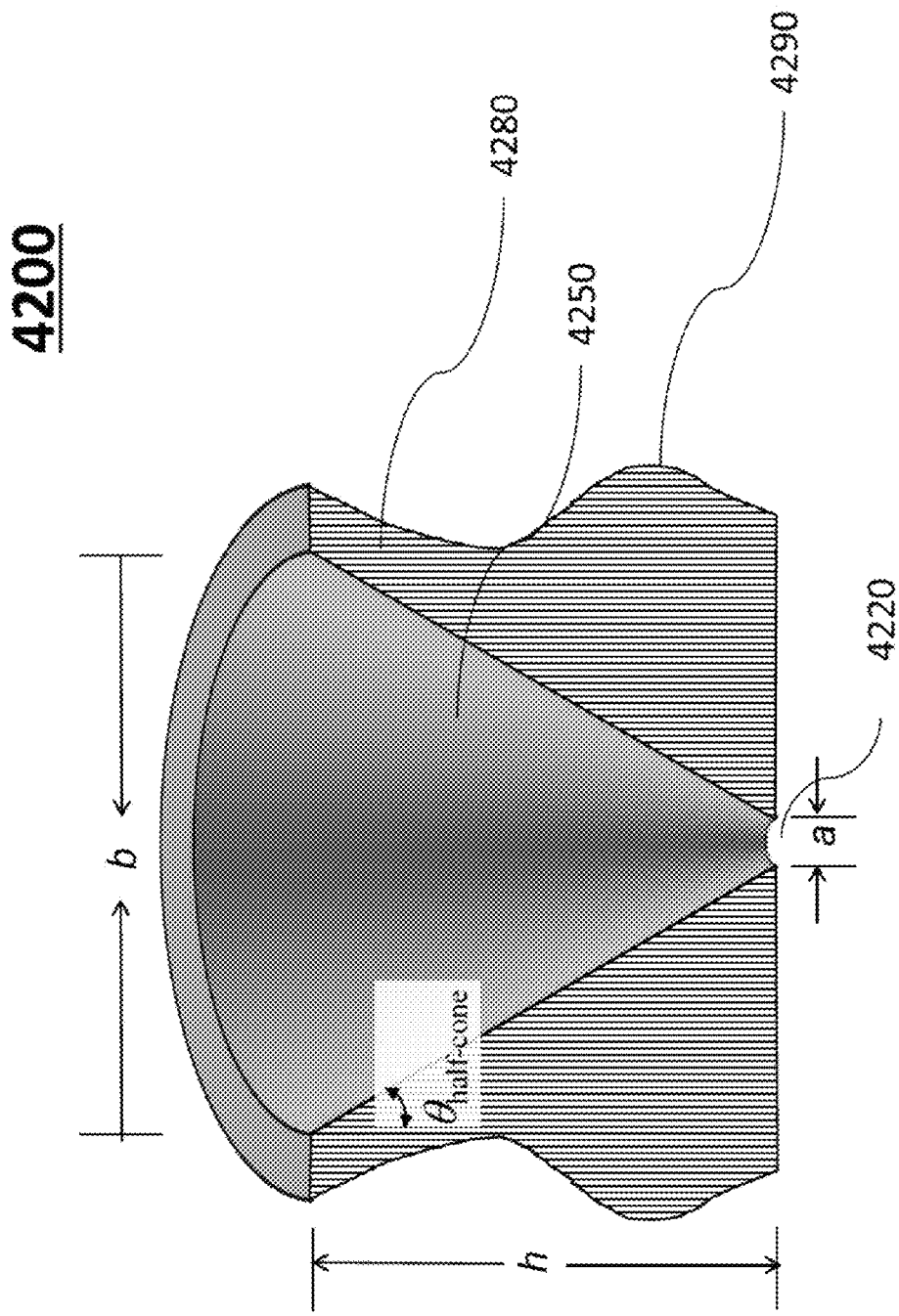
FIG. 4A illustrates a cross-sectional view of an example of a cone mirror.

FIG. 4A shows a drawing of the cone mirror 4200. To clearly illustrate the reflective surface 4250 of the cone mirror 4200, FIG. 4A shows the cone mirror 4200, cut half along a vertical plane 4280 that goes through the center axis of the cone. The cone-shaped mirror 4200 has a reflective sidewall surface 4250, which has a constant sidewall profile slope at the intersection of the cone mirror sidewall surface with any plane in which the center axis lies in, with a slope angle, $\theta_{half-cone}$, or also called half-cone angle, about 30° or larger. Any suitable materials can form the reflective surface. For example, the cone mirror can be fabricated by coating a reflective layer on the inside surface 4250 of the cone. The cone mirror can also be fabricated by polishing a metal cone to achieve the specular reflection on the surface 4250. The cone mirror can further be achieved using total internal reflection by forming a cone on the light emitter using high-index optical material, so that the total internal reflection will happen at the cone surface. The cone mirror can be fabricated using any other means as long as it provides a reflective cone surface 4250.

The cone angle of the cone mirror is double of the $\theta_{half-cone}$. Accordingly, the cone angle of the cone mirror is about 60° or larger. The curvature or shape of the outside surface 4290 of this cone mirror 4200 can be anything, as long as it does not affect its inside reflective surface 4250. The cone mirror 4200 has a base opening 4220 with a diameter, a. The height of the cone mirror 4200 is h, which is much larger than the base opening 4220 diameter, a. The cone mirror has a top opening with diameter of b, which is much larger than the base opening 4220 diameter, a, based on the geometrical relationship.

The base opening of the cone mirror is where light enters the cone mirror. The edge 4225 of the base opening 4220, as shown in FIG. 4B, cut in half along a vertical plane 4280 that goes through the center axis of the cone, can be sharp so that the light can only be reflected by the cone surface with slope angle of $\theta_{half-cone}$, as soon as it enters the cone mirror base opening 4220. In some embodiments, wherein the emitter is located inside the cone mirror, this sharp edge may not be required. The bottom 4221 of the cone mirror is not necessary to be horizontally flat. It may be conformal to the emitter's supportive base 1400 as shown in FIG. 1 to provide mechanical support to the cone mirror. It can also have other curvatures as long as it enables the cone mirror to confine the emitter 4100 inside or beneath the base opening 4220.

To maximize the light emitted from the emitter 5100 entering the cone mirror, the emitter is located inside the cone mirror base or just beneath the cone mirror base. Also, the diameter of the cone mirror base opening, a, should be equal to or smaller than, but preferably close to the dimension of the emission surface of the emitter 5100 which is defined by the physical boundary of the emitter's emission surface. For example, FIG. 5A shows a side view of a flat emitter 5100. Only a portion of the cone mirror 5200 is shown in FIG. 5A. The emission area 5101 is embedded inside other components 5150, such as the mechanical frame, of the emitter 5100. The emission area 5101 may be or may not be covered by a protection optical window on the top. The whole emitter 5100 is placed beneath the cone mirror 5200 with the cone mirror base opening 5220 located above the emission area 5101. The cone mirror bottom is conformal to the emitter frame 5150 such that all of or the majority of the light emission from the emission surface can enter the cone mirror. The sharp edge 5225 of the cone mirror may ensure that the light emission emitted to the side can be reflected only by the cone mirror surface with slope angle of $\theta_{half-cone}$.

In FIG. 5A, the emission surface 5101 of the emitter 5100 has the diameter equal to the diameter of cone mirror base opening 5220, a. The edge of the cone mirror base opening 5220 is well aligned with the physical boundary of the emission surface 5101. Only a portion of the cone mirror 5200 is shown in FIG. 5A. In some embodiments, the emission surface 5101 of emitter 5100 can be larger than area of cone mirror base opening 5220. In such case, the emission area that are directly beneath the cone mirror base opening 5200 will primarily contribute to the light emission that enter the cone mirror. In some other embodiments, the emission area 5101 of the emitter 5100 can be smaller than the area of cone mirror base opening 5220. In such cases, the emission area 5101 of the emitter 5100 and the area of cone mirror base opening 5220 are substantially close, such as their diameter difference is less than 30% of the base opening diameter, so that the emission surface 5101 and its image(s) formed by cone mirror together can form a virtual point light source.

Figure 5B:
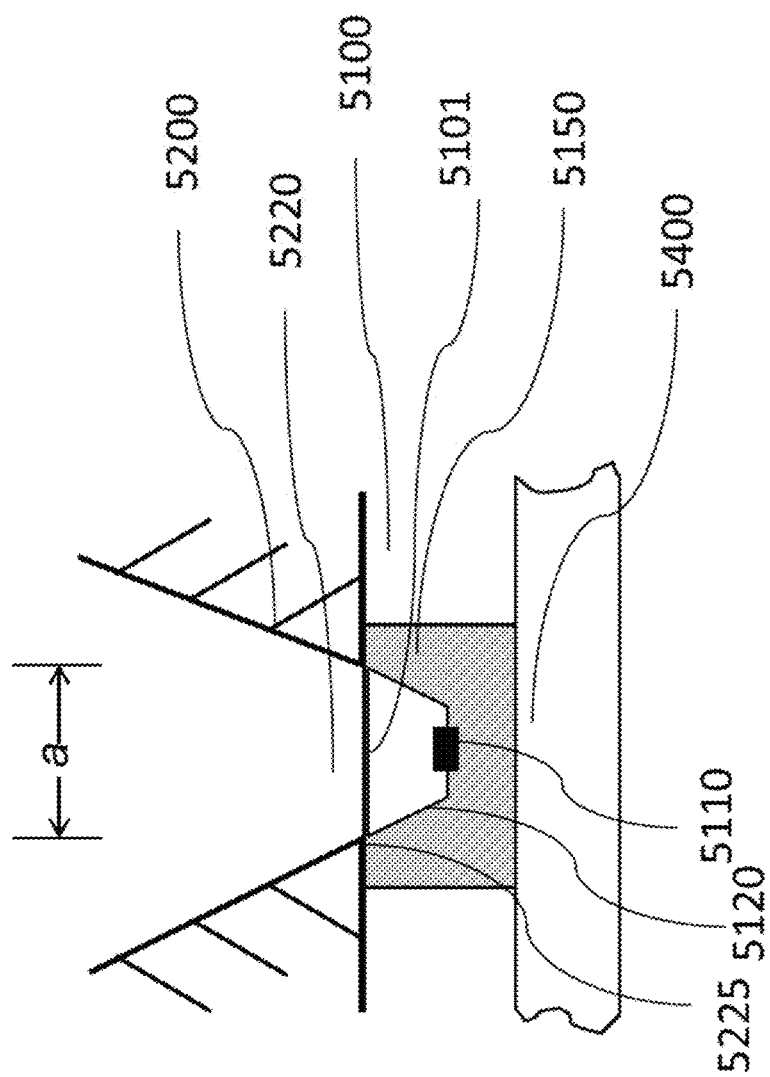
FIG. 5B illustrates an example of a light emitter including a reflective cup.

FIG. 5B illustrates an embodiment of light emitter 5100. Only a portion of the cone mirror 5200 is shown in FIG. 5B. The light emitter 5100 includes light emitting device 5110, reflective cup 5120, optical window 5101, and frame 5150. In such a light emitter 5100 structure, the optical window 5101 can be treated as the emission surface of this emitter, because all of the light emission from the emitting device 5110, is collected by the reflective cup 5120 and output from the optical window 5101. Therefore, the cone mirror is placed above the emitter 5100 with cone mirror base opening 5220 well aligned with optical window 5101. The cone mirror bottom is conformal to the emitter frame 5150 so that all of or the majority of the light emission from the optical window 5101 can enter the cone mirror. The sharp edge 5225 of the cone mirror can help to confine the side emission such that light is only reflected by the cone mirror surface with a slope angle of $\theta_{half-cone}$.

In FIG. 5B, the optical window 5101 of the emitter 5100 has the diameter equal to the diameter of cone mirror base opening 5220, a. The edge of the cone mirror base opening 5220 is well aligned with the physical boundary of the optical window 5101. In some embodiments, the optical window 5101 of emitter 5100 can be larger than area of cone mirror base opening 5220. In such a case, the optical window area that is directly beneath the cone mirror base opening 5200 primarily contributes to the light emission that can enter the cone mirror. In some embodiments, the optical window 5101 of the emitter 5100 can be smaller than the area of cone mirror base opening 5220. In such cases, the area of the optical window 5101 of the emitter 5100 and the area of cone mirror base opening 5220 should be substantially close, such as their diameter difference is less than 30% of the base opening diameter, so that the optical window 5101, as the emission surface, and its image(s) in cone mirror together can form a virtual point-source.

FIG. 5C shows another embodiment of emitter 5100 beneath cone mirror base opening 5220. Only a portion of the cone mirror 5200 is shown in FIG. 5C. The emitter 5100 includes light emitting device 5110, transparent dome lens 5101, and frame 5150. All of the light emitted from the emitting device 5110, exits the emitter 3100 through the dome lens 5101. Thus, the transparent dome lens 5101 can be treated as the emission surface of this emitter. To maximize the light emission entering the cone mirror, the emitter 5100 is placed in a way that the whole dome lens 5101 is inside the cone mirror base opening as shown in FIG. 5C. The cone mirror bottom is conformal to the emitter frame 5150 so that all of or the majority of the light emission from the dome lens 5101 can enter the cone mirror. The sharp edge 5225 of the cone mirror may help to confine side light emission such that light is only reflected by the cone mirror surface with slope angle of $\theta_{half-cone}$. In FIG. 5C, the dome lens 5101 of the emitter 5100 has a horizontal dimension equal to or smaller than the diameter, a, of cone mirror base opening, because it is completely inside the cone mirror opening. The dome lens 5101 area of the emitter 5100 and the area of cone mirror base opening are substantially close, such as their diameter difference is less than 30% of the base opening diameter, so that the dome lens 5101, as the emission surface, and its image(s) formed by the cone mirror together can form a virtual-point light source.

Figure 5D:
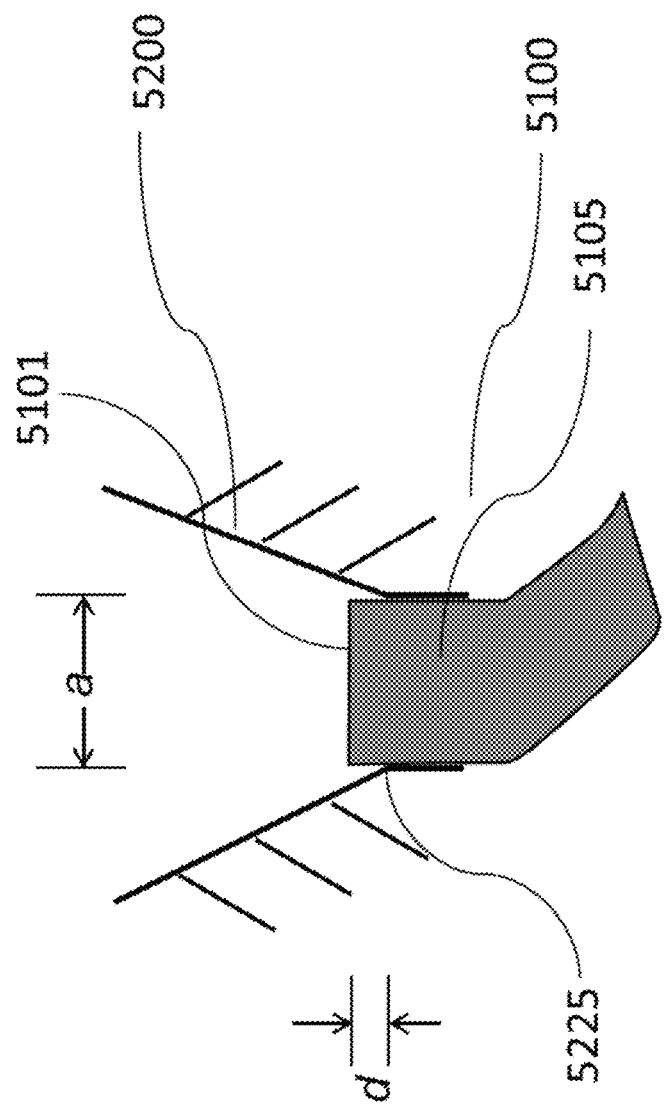
FIG. 5D illustrates an example of a light emitter including a light transmission device.

FIG. 5D shows another embodiment of emitter 5100. Only a portion of the cone mirror 5200 is shown in FIG. 5D. The emitter 5100 includes light transmission device 5105, with a light exit surface 5101 at the top. The light transmission device can be any optical device that can confine and transmit the light inside and output the light at the end surface. They can be, but not limited to, optical fiber, fiber bundle, light guide, waveguide, and others. The light output from the light exit surface 5101 of the light transmission device 5105 enters the cone mirror. To maximize the light emission entering the cone mirror, the light transmission device 5105 should be placed in a way that its light exit surface 5101 should be at the base of the cone mirror or inside the cone mirror base opening.

As shown in FIG. 5D, the distance between light exit surface and cone mirror base is denoted as d. Distance d, is small, for example d<a, so that all of the light emitted from light exit surface 5101 can be treated as light coming from the base opening of the cone mirror. In some embodiments, the cone mirror bottom is not necessary to be horizontally flat. It can have a vertical wall to help to confine the light transmission device inside the cone mirror base opening. The edge 5225 of the cone mirror base opening can be sharp to help confine side light emission such that light is only reflected by the cone mirror surface with a slope angle of $\theta_{half-cone}$.

In FIG. 5D, the diameter of the light exit surface 5101 is equal to or smaller than the diameter, a, of cone mirror base hole, because it is completely inside the cone mirror hole. The light exit surface 5101 area of the light transmission device 5100 and the area of cone mirror base opening 5220 are substantially close, such as their diameter difference is less than 30% of the base opening diameter, so that the light exit surface 5101, as the emission surface, and its image(s) formed by cone mirror together can form a virtual point-source. The light exit surface 5101 area of the light transmission device 5100 can be larger than the area of the cone mirror base opening 5220, if the light exit surface 5101 is beneath the cone mirror base opening 5220. In such case, area of light exit surface 5101 directly beneath of the cone mirror base opening 5220 primarily contributes to the light emission that can enter the cone mirror.

In some embodiments, there are other possible configurations to arrange the light emitter and cone mirror. The light emitter and the cone mirror are arranged in a way that the emission from the light emitter to enter the cone mirror from its base opening with minimized optical loss. Further, the cone mirror base opening is small enough such that the gap between the cone mirror base opening and the light emitter is minimized.

FIG. 5E shows a top view of an embodiment of an emitter 5100 located at the base of the cone mirror 5200. In this embodiment, the emitter 5100 has a circular emission area 5101. The emission area can be the direct emission area as in FIG. 5A, or the optical window as in FIG. 5B, or the dome lens surface as in FIG. 5C, or the light exit surface as in FIG. 5D, or emission surface of other emitters. The diameter of the emission area 5101 should be equal to or slightly smaller, such as less than 30%, than the diameter of cone mirror base opening, a, such that the emission area 5101 and its image(s) formed by the cone mirror together can form a virtual point-source. In some embodiments, the diameter of the emission area 5101 can be larger than the diameter, a, of the cone mirror base opening while still enable the formation of virtual point-source. The light emitted from the emission surface within the edge 5225 of the cone mirror base opening enters the cone mirror.

Figure 5F:
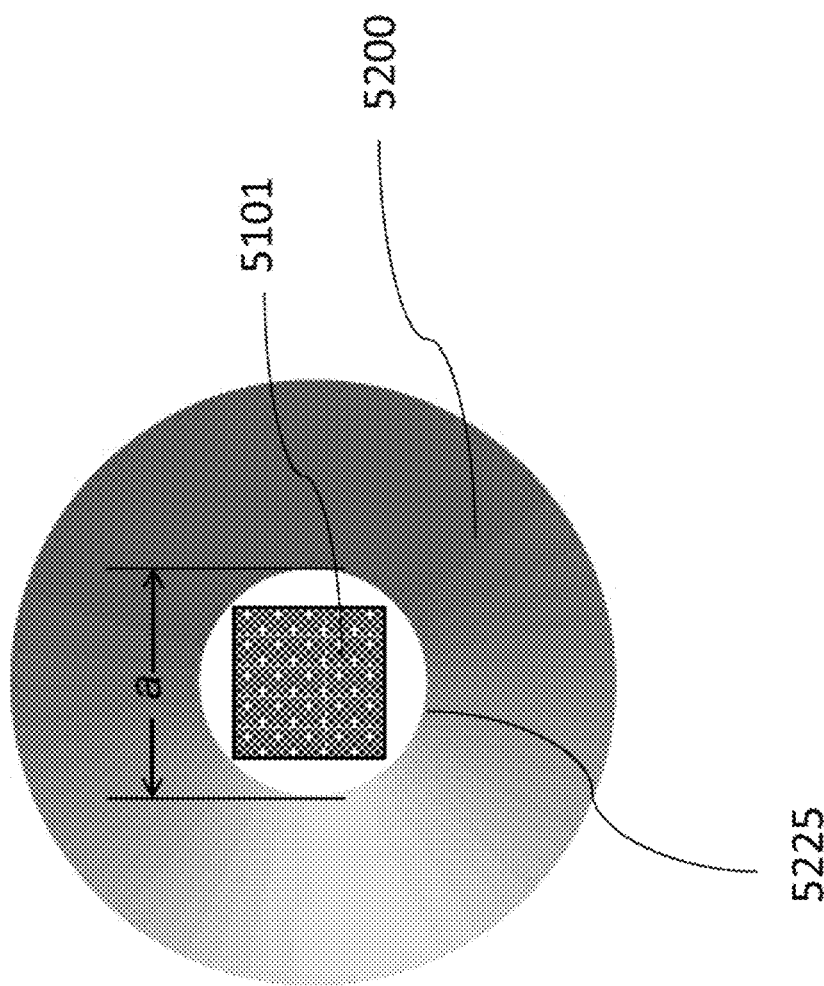
FIG. 5F illustrates an example of a light emitter having a square emission area.

FIG. 5F shows a top view of another emitter located at the base of the cone mirror 5200. In this case, the emitter has a square emission area 5101. The emission area can be the direct emission area as in FIG. 5A, or the optical window as in FIG. 5B, or the dome lens surface as in FIG. 5C, or the light exit surface as in FIG. 5D, or the emission surface of other light emitters. The largest dimension of this square emission surface 5101 is the length of its diagonal line. To ensure all of the light emission from the emission surface can enter the cone mirror, the diameter, a, of cone mirror base opening, is equal to or larger than the length of the diagonal line of the square emission surface, as shown in FIG. 5F. Additionally, the emission area 5101 should be large enough, such as its diagonal should be close to, or lightly smaller, such as less than 30%, than the diameter of cone mirror base hole, a. so that the emission area 101 and its image(s) formed by the cone mirror together can form a virtual point-source.

In some embodiments, the diagonal of the emission area 5101 is larger than the diameter, a, of the cone mirror base opening. This can still enable the formation of virtual point-source. The light emitted from the emission surface within the edge 5225 of the cone mirror base opening can enter the cone mirror. In other embodiments, the emission surface of the emitter can be in other shapes. The cone mirror base opening can also be in shapes other than circle. The dimension of the cone mirror base opening is large enough such that all or most of the light emitted from the emitter can enter the cone mirror through the base opening. Meanwhile, the dimension of the cone mirror base opening should also be small enough so that it can be close to the dimension of the emission surface of the emitter so that a virtual point-source can be formed, which includes emission surface of the emitter, and its image(s) formed by the cone mirror. For example, the smallest gap between the edge of the cone mirror base opening and the emitter's emission surface boundary can be less than 30% of the dimension of the cone mirror base opening.

In one embodiment, the cone mirror is used to collect the light emission with broad angular distribution to form a directional virtual-point source. Such a mirror does not necessarily have a circular cross-sectional shape, as described in previous figures. Square cross-section mirrors or polygonal shape cross-section mirrors with reflective sidewall surfaces, as shown in FIGS. 6A-6E, with a base opening can also be used to collect the light emission with broad angular distribution from the light emitter to form a directional virtual-point source and be used as a component for the directional light source fabrication.

Figure 6A:
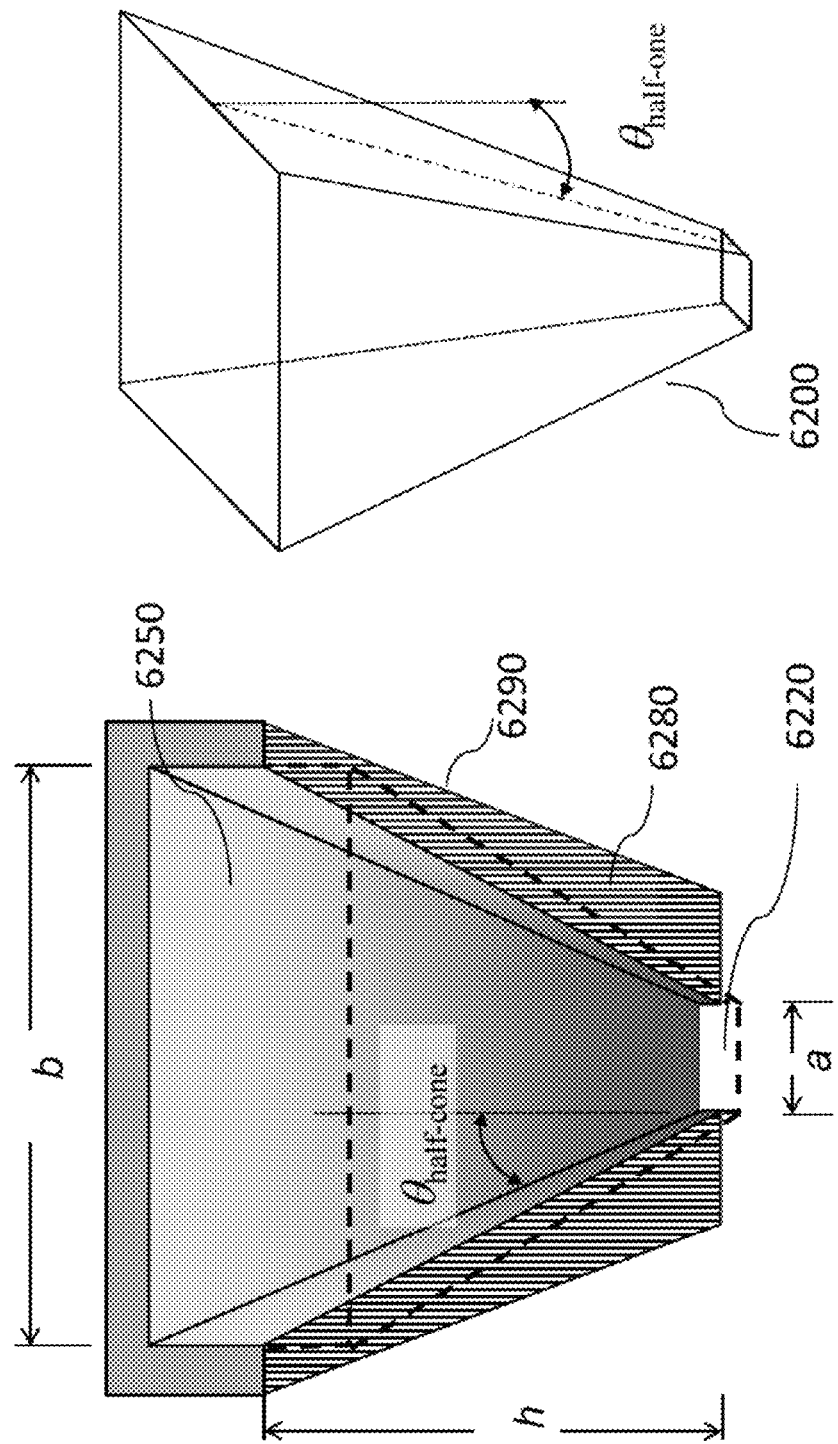
FIG. 6A illustrates an example of a square cross-sectional mirror with reflective inside surfaces.

FIG. 6A shows a square cross-sectional mirror with reflective sidewall surfaces. To clearly illustrate the reflective surfaces of the mirror, only half of this mirror is drawn. The vertical central plane 6280 of the mirror goes through the central axis of the mirror. The slope angle of the reflective surface 6250 is about, $\theta_{half-cone}=30°$ or larger. The outside surface 6290 of the mirror can have any curvature. The height, h, of the mirror is much larger than the dimension of the base opening, a. A square light emitter, such as, but not limited to, LED emitter, can be placed at the base or beneath the base opening 6220 to enable a virtual-point source with light emission toward to a solid angle that is defined by the square cross-sectional mirror.

Figure 6B:
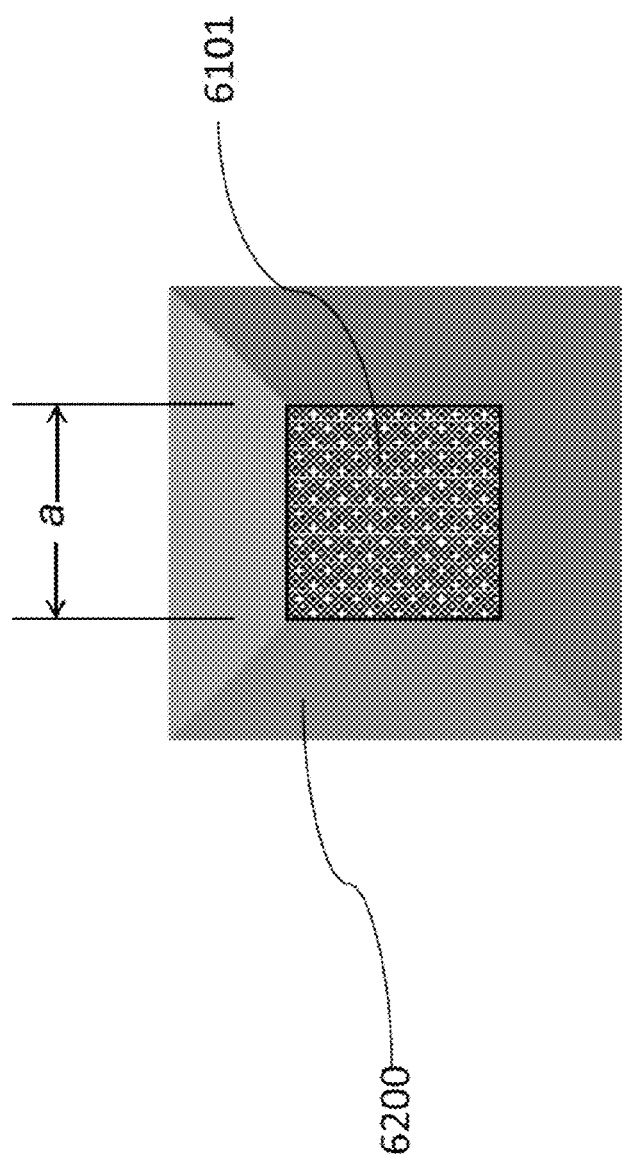
FIG. 6B is a top view of the square cross-sectional mirror with reflective inside surfaces.

A top view of the square emission surface 6101 of the light emitter placed at the base of the square cross-sectional mirror is shown in FIG. 6B. The emitter can also be placed in other orientations. The dimensions of the square emission surface 6101 of the light emitter is substantially close to, such as less than 30%, the dimensions of the mirror base opening so that the emitter's emission surface 6101 and its image(s) formed the reflective surfaces of the mirror can be close to each other to form a virtual point-source. In some other embodiments, light emitter having emission surface with other shapes, such as, but not limited to, rectangles, circles, ovals and others, can also be used with this square cross-sectional mirror, as long as their dimensions is substantially close to the dimension of the base opening dimension, such as that the smallest gap between emission surface of the emitter and the mirror base opening edge is less than 30% of the dimension of mirror base opening, to enable a virtual point-source. Similarly, in another embodiment, a rectangular cross-sectional mirror with a rectangular base hole and mirror top opening can also be used. A rectangular-shaped light emitter or other shape emitter can be placed at the base to enable a virtual point-source.

Figure 6C:
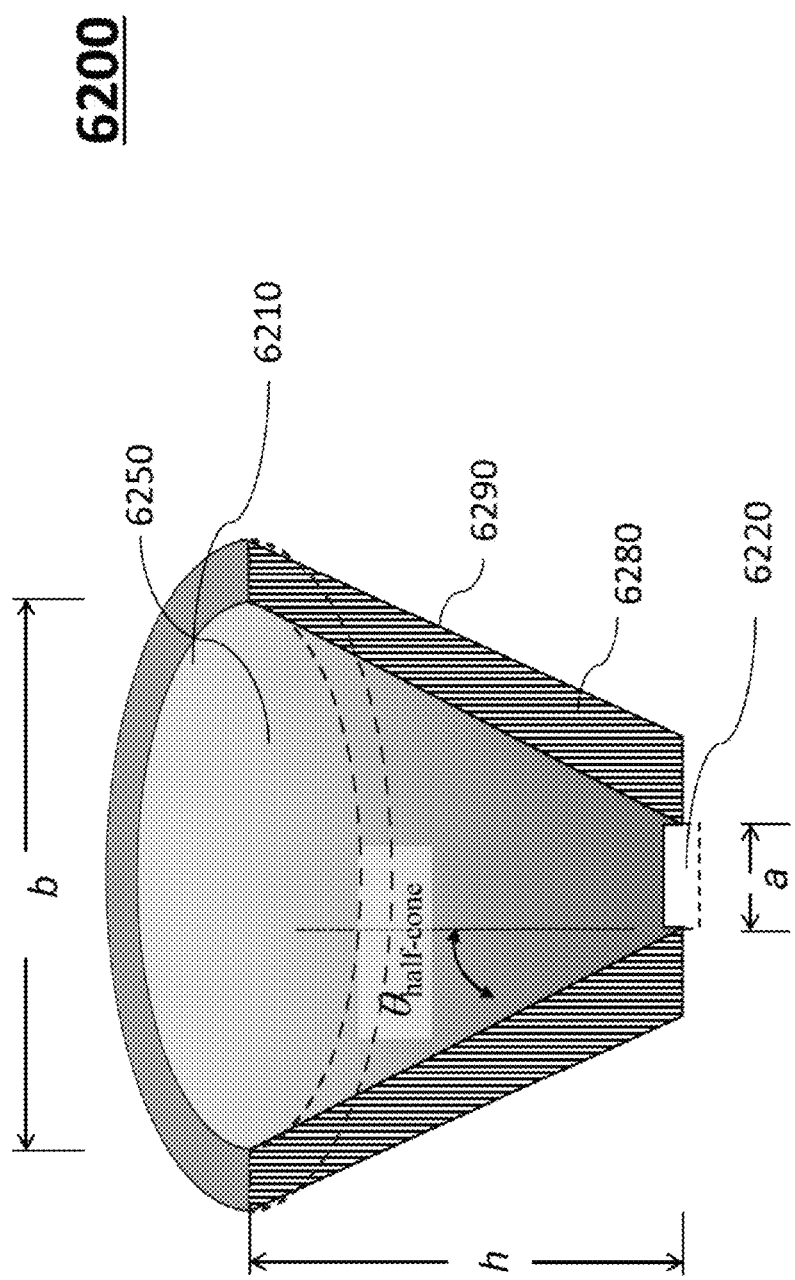
FIG. 6C illustrates a cross-sectional view of an example of a cone mirror with square base opening and circular top opening.

In one embodiment, the mirror has different shapes at the base opening 6220 and top opening 6210 as shown in FIG. 6C. To clearly illustrate the reflective surface(s) of the mirror, only half of this mirror is drawn. The vertical central plane 6280 of the mirror goes through the central axis of the mirror. The base opening 6220 of the mirror has a square shape. The top opening 6210 of the device has a circular shape. The shape of the base opening 6220 and top opening 6210 of the mirror can be any other shape, such as, but not limited to a, rectangle, triangle, oval, polygon, or others. The reflective surface 6250 of the mirror has a constant profile slope at the intersection of the mirror's reflective surface with any plane in which the center axis lies in, with a slope angle about, $\theta_{half-cone}=30°$ or larger. The outside surface 6290 of the mirror can have any curvature. The height, h, of the mirror is much larger than the dimension of the base opening, a. A square light emitter, such as, but not limited to, LED emitter, can be placed at the base or beneath the base hole to enable a virtual-point source with light emission toward to a solid angle that defined by the mirror device. The light emitter with square emission surface 6101 can be placed in the base opening 6220 as shown in FIG. 6B, or other orientation. Light emitter with emission surface having other shapes, such as, but not limited to, rectangle, oval, circle, triangle, polygon, irregular shape, or others, can also be used.

Figure 6D:
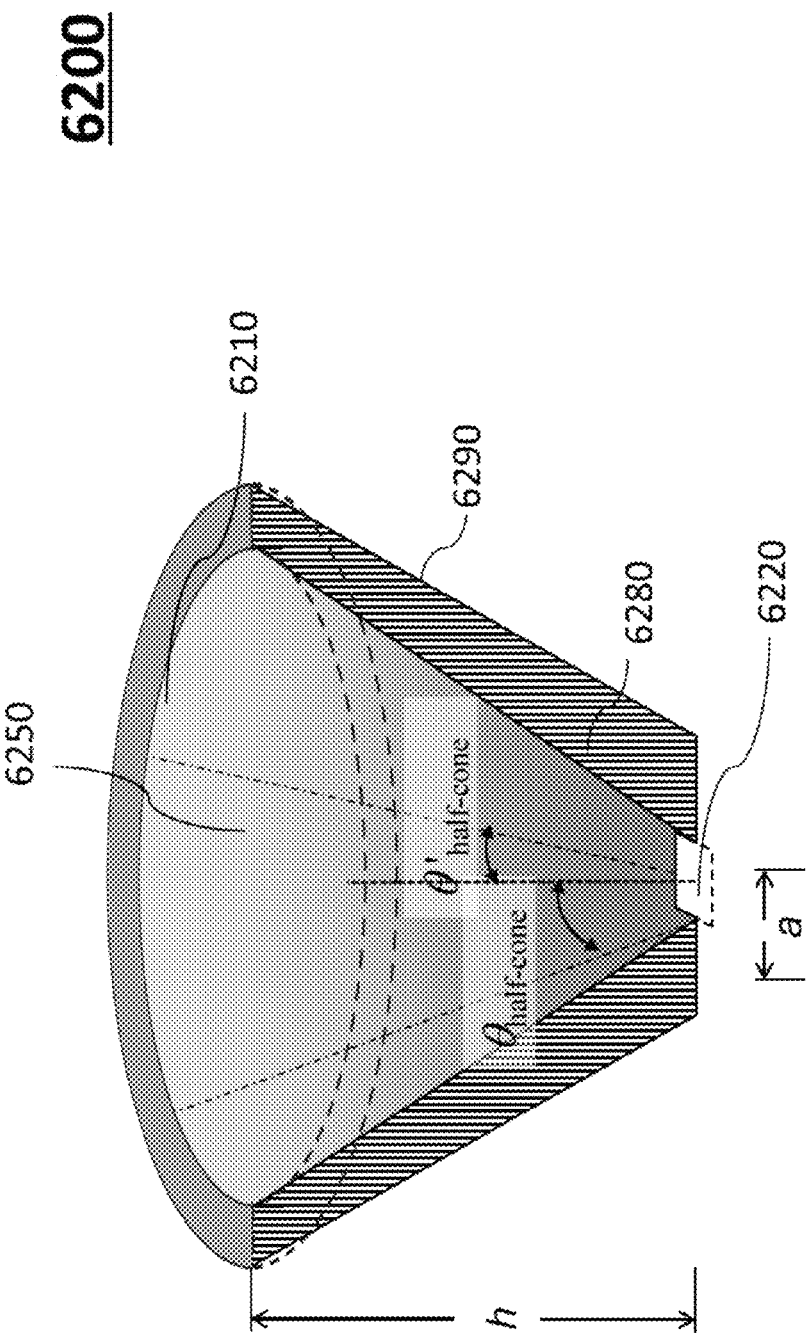
FIG. 6D illustrates a cross-sectional view of an example of a cone mirror with square base opening and an oval top opening.

In one embodiment, the mirror device has different shapes at the base opening and at top opening as shown in FIG. 6D. To clearly illustrate the reflective surface of the mirror, only half of this mirror is drawn. The vertical central plane 6280 of the mirror goes through the central axis of the mirror. The base opening 6220 of the device has a square shape. The top opening 6250 of the device has an oval shape. As a result, the slope angles of the reflective surface 6250 at different orientations, $\theta_{half-cone}$ and $\theta'_{half-cone}$ have different values. The shape of the base opening and top opening of the mirror can be any other shape, including symmetric and asymmetric shapes. The reflective surface of the mirror always has a constant profile slope at the intersection with any plane in which the center axis lies in, although this profile slope may have different angle value at each intersection plane. Additionally, any slope angle, $\theta_{half-cone}$ or $\theta'_{half-cone}$, of the inside reflective surface 6250 is about 30° or larger. The outside surface 6290 of the mirror can have any curvature. The height, h, of the mirror is much larger than the dimension of the base opening, a. A light emitter with shape same as or different from the mirror base opening 6220 can be placed at the base or beneath the base opening to enable a virtual point-source with light emission toward to a solid angle that defined by the mirror device.

Figure 6E:
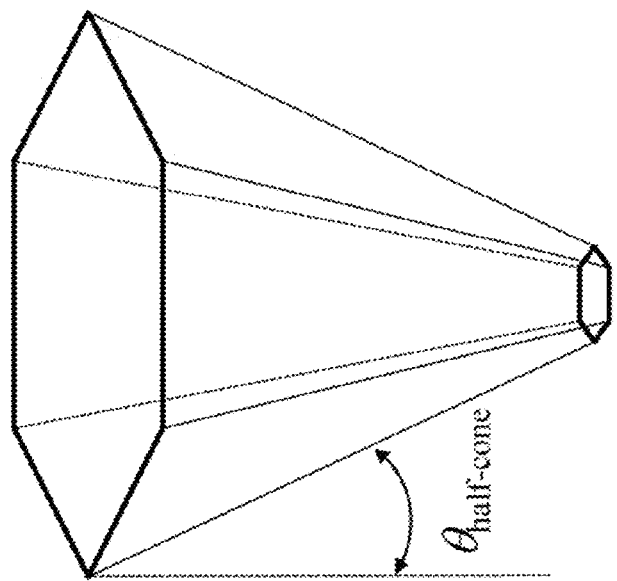
FIG. 6E illustrates an example of a polygonal cross-section mirrors with reflective inside surfaces.

Other polygonal cross-section mirrors with reflective surfaces, such as shown in FIG. 6E can also be used. Also, in some embodiments, polygonal cross-section mirror with cross-section having different shapes, such as, but not limited to a square at the base and circle at the top, or a rectangle at the base and square at the top, or a circle at the base and polygonal at the top, or other combination of geometries, can be used, as long as the sidewall profile has a constant slope at the intersection with any plane in which the center axis lies in The sidewall profile slope can be the same or different at different intersection planes as long as the slope has a constant value for each intersection plane.

In one embodiment, the cone mirror and optical focusing device together forms the collimation optics for the light emitter, which can collimate the light emission from a light emitter with minimized optical loss. In this collimation optics, the cone mirror has a small opening at the base, which has a diameter much smaller than the height of the cone mirror. The slope angle of the reflective sidewall of the cone mirror is about $\theta_{half-cone}$=30° or larger. The optical focusing device is located at the top of the cone mirror with a focal point located at the proximity of the cone mirror base opening. The optical focusing device should be in contact with or proximal to the cone mirror top opening and its edge, such that minimal light can escape from this collimation optics.

Figure 7A:
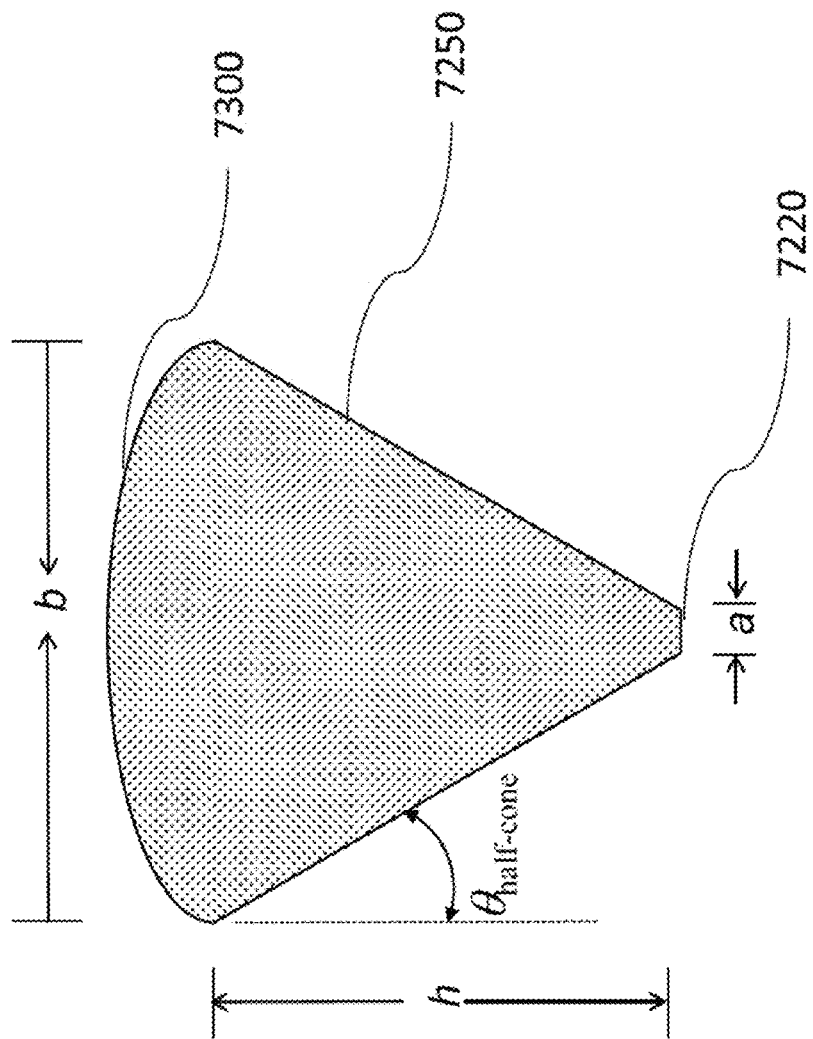
FIG. 7A illustrates a schematic side view of an example transparent cone-shaped collimation lens with a flat base.

Such a collimation optics can also been realized by a transparent cone-shaped collimation lens using total internal reflection at the side and curved focusing interface at the top, as shown in FIG. 7A. A schematic side view of this transparent cone-shaped collimation lens is shown in FIG. 7A. In one embodiment, this collimation lens is made of transparent material, such as glass, plastics, epoxy, silicone, encapsulant or any other transparent optical material. It can be machined, molded or fabricated using other means to achieve its geometry. It has a small base 7220, which is the receiving end to receive the light emission from the light emitter. Its sidewall surface 7250 has a constant profile slope at the intersection with any plane in which the center axis lies, with slope angle of about $\theta_{half-cone}$=30° or larger. The surface of the sidewall 7250 is smooth so that total internal reflection can occur for the light inside the lens that hits the sidewall 7250. In other embodiments, this total internal reflection surface 7250 can be fully or partially coated with a reflective coating, such as a metal layer, dielectric layers, and other coatings, to achieve the surface reflection without affecting the collimation function of this cone-shape collimation lens.

The total internal reflection sidewall can be considered as a cone mirror 7200. The top surface of this collimation lens has a curvature such that the curved interface 7300 between lens material and ambient, such as air, can have a collimation or concentration function, and can be treated as an optical focusing device. Therefore, the optics analysis described in previous paragraphs can be applied on this collimation lens. The curvature of the top surface 7300 should be chosen to enable a focal point of this curved surface 7300 at the proximity of the base 7220 of the lens to achieve a small output optical beam angle. The height, h, of cone-shaped sidewall of the lens is much larger than diameter of base, a, such that the base, as the light receiving end, and its image(s) formed by the total internal reflection surface 7250 can be a virtual-point light source with respect to the curved top surface 7300, as an optical focusing device 7300. The curvature of the top surface can be any one as long as its focal point is in the proximity of the base 7220. For example, aspheric curvature, spherical curvature, Fresnel surface, and others, all can be used for top surface 7300. The collimated or concentrated beam angle for light output from this collimation lens can vary depending on the curvature of the top surface. For example, an aspheric top surface may enable a beam with a smaller beam angle compared to a spherical top surface. The curvature of the top surface 7300 can also be chosen to have a variety of focal lengths such that its focal point can be close or far away from the base 7220 of the lens. As a result, the output optical beam with a variety of beam angle can be achieved if such a lens is applied to the light emitter.

Figure 7B:
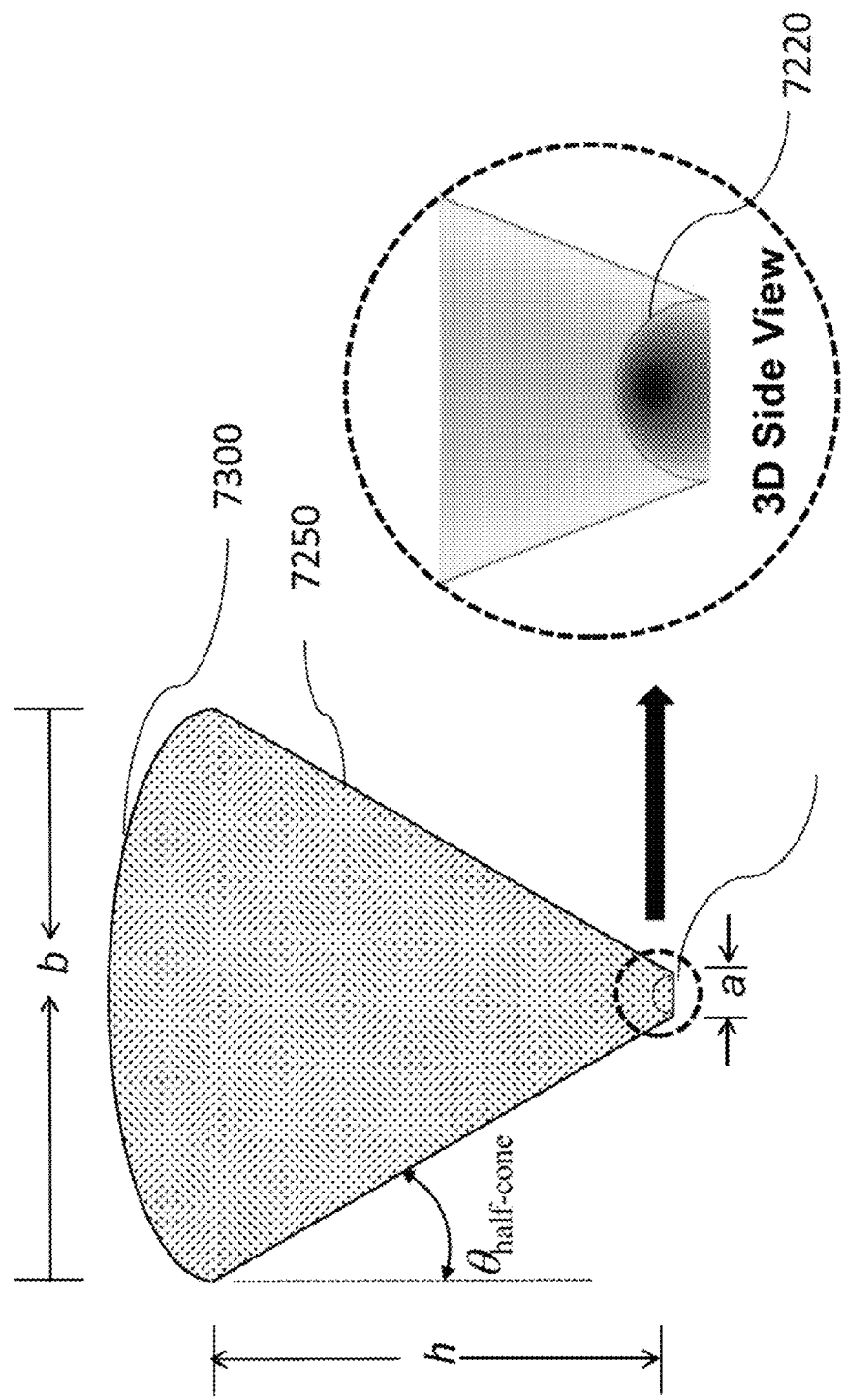
FIG. 7B illustrates a schematic side view of an example transparent cone-shaped collimation lens with a concave semi-spherical base.

In some embodiments, the base 7220 of this cone-shaped collimation lens is not necessarily flat. Its surface morphology is designed to maximize the collection of light emission from light emitter For example, if the light emitter has a flat emission surface, the cone-shaped collimation lens base 7220 can have a flat surface, as shown in FIG. 7A, to conform to the emission surface of the emitter. If the light emitter 7100 has a spherical dome emission surface, such as in Cree's XLamp emitters, the cone-shaped collimation lens base 7220 can have a concave semi-spherical shape, as shown in FIG. 7B, to conform to the emission surface of the emitter, so that the light collection by the cone-shaped collimation lens base 7220 can be maximized. To clearly illustrate the geometry of the collimation lens base 7220 with concave semi-spherical curvature, a cross-sectional view of the lens base that cut half along the plane passing through the center axis of the collimation lens is also shown in FIG. 7B. The concave semi-spherical curvature of the collimation lens base 7220 shown in the FIG. 7B should have a diameter similar to the diameter of the light emitter dome lens that the collimation lens is to be attached to, such that the collimation lens can conform to the dome lens of the emitter. Since the base dimension, a, is much smaller than the height, h, and the diameter, b, the base 7220 morphology does not significantly affect the collimation function of the collimation lens. The collimation lens base 7220 can have any curvature or shape to conform to the emitter surface to maximize the light emission entering the collimation lens.

The cone-shaped collimation lens as shown in FIG. 7A and FIG. 7B, can be installed on top of the light emitter 7100 to enable a directional light source with a small beam angle, as shown in FIG. 7C. The cone-shaped collimation lens base 7220 should be on the emission surface 7101 of the emitter 7100 so that light emission can enter the collimation lens through the base 7220. The cone-shaped collimation lens can be mechanically disposed on top of the emitter 7100, or attached on top of the emitter 7100 using an optical adhesive, such as epoxy, silicone, encapsulant, polymers, and others. The cone-shaped collimation lens can also be directly packaged together with the emitter 7100 to achieve an integrated directional light source, such as shown in FIG. 7B. For example, the cone shaped collimation lens can be packaged with the LED chip together to enable the directional light source using LEDs. The dimension of the collimation lens base 7220 can be the same as, or larger than but close to, the dimension of emission surface area such that all of the light emission from the emitter can be received by the collimation lens to form a virtual-point source consisting of emission surface itself and its image(s) formed by the total internal reflection surface 7250. Light is eventually collimated or concentrated and then outputs from the top surface of the lens 7300. In some embodiments, the curvature of the top surface 7300 of the cone-shaped collimation lens can vary to achieve other focal lengths, so that its focal point is at some distance away from the light emitter. As a result, different beam divergence angles of the output optical beam can be achieved. In addition, the cross-section of the collimation lens can have shapes other than circular shapes, such as, but not limited to, squares, rectangles, other polygonal shapes, or others. Also, the collimation lens can have any of the geometries that a cone mirror can have as discussed in the previous embodiments.

Figure 8A:
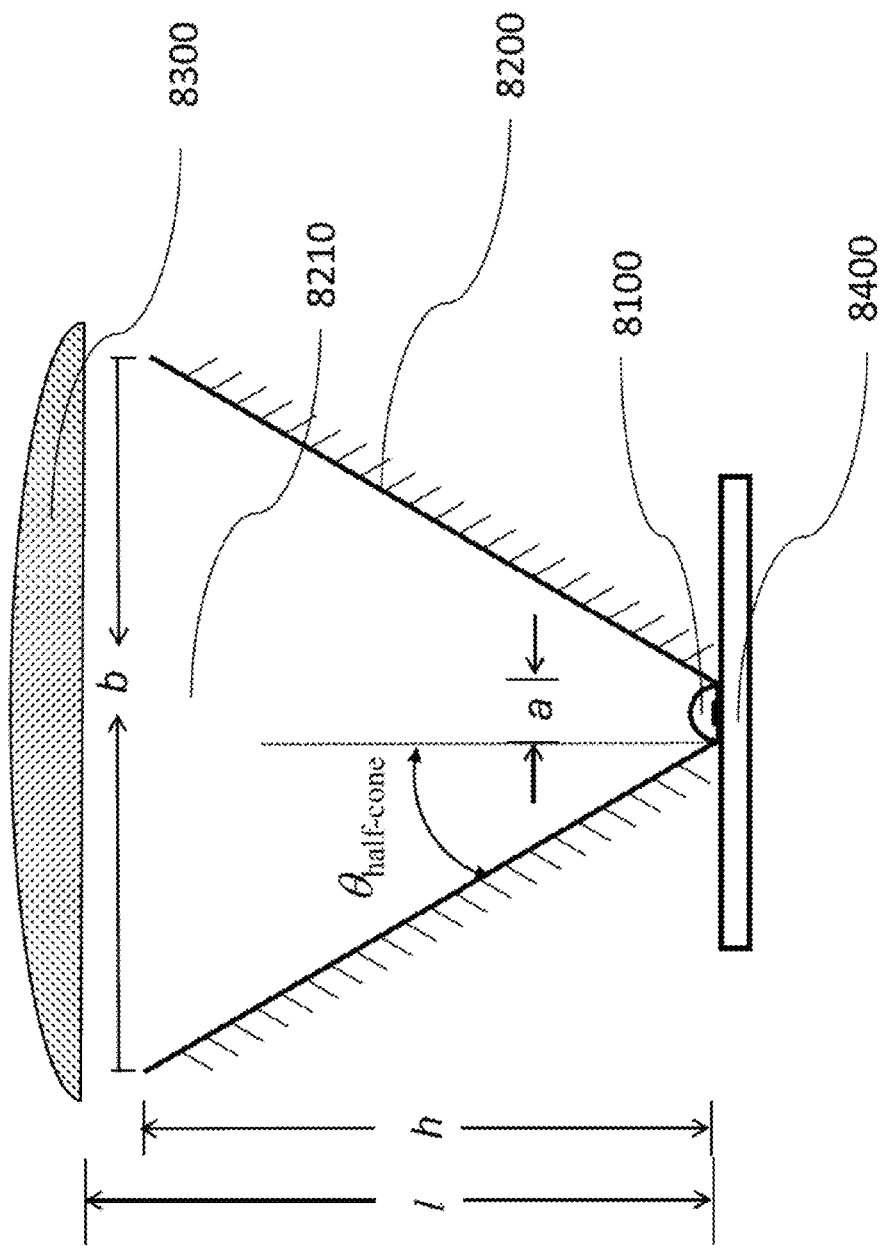
FIG. 8A illustrates an example of a directional light source including commodity emitter.
Figure 8B:
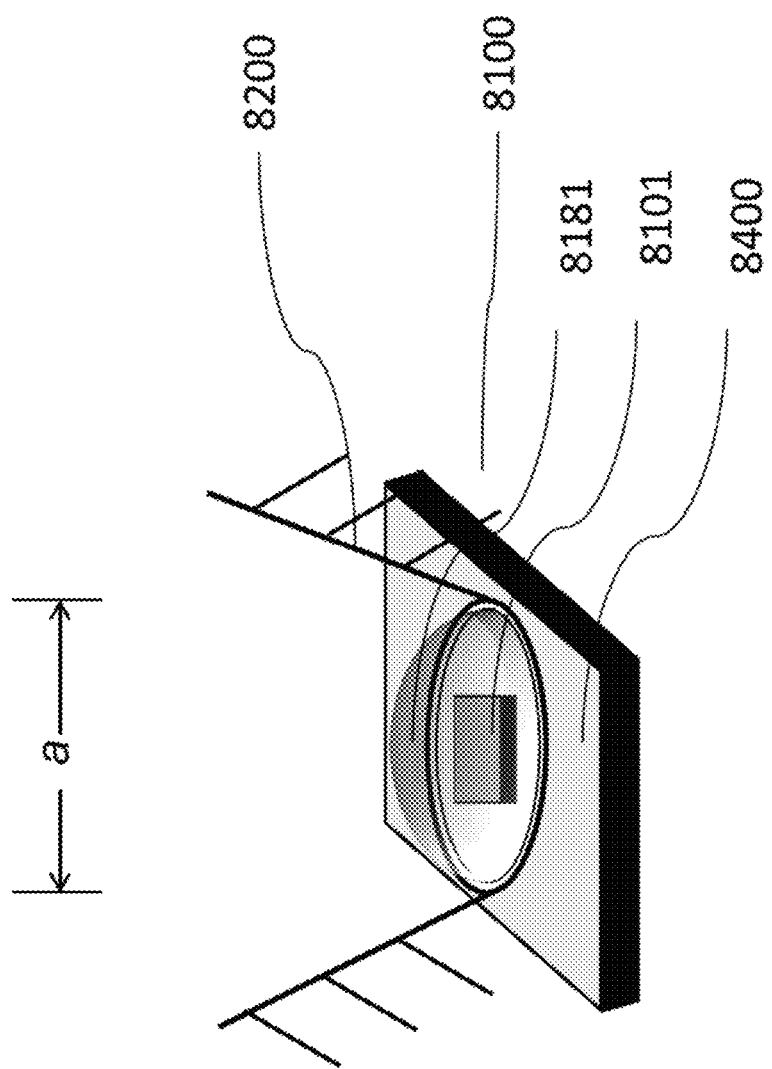
FIG. 8B illustrates the commodity emitter in the directional light source.

FIG. 8A illustrates one embodiment of a directional light source. In the embodiment, the example light emitter 8100 used is a Cree's XLamp XM-L emitter, which has a LED chip 8101 with area of about 2 mm×2 mm, as shown in FIG. 8B. The LED chip has a Lambertion emission pattern. The LED chip is encapsulated inside a transparent silicone dome lens 8181 which has diameter of about 4.4 mm. Therefore, the overall diameter of the emitter 8100 is 4.4 mm. The light emitter 8100 is placed beneath the base of the cone mirror 8200 which has a circular base opening and a circular top opening, as shown in FIG. 8B. The diameter of the cone mirror base is a=4.6 mm, which is very close to the diameter of the emitter 8100. The height of the cone mirror is h=34 mm. The opening of the cone mirror has a diameter of b=44 mm. The cone mirror has a reflective surface, such as a silver coated surface, with a reflectivity of 98%. In other embodiments, the reflectivity of the cone mirror can be other values. A plano-convex aspheric lens 8300 is placed on top of the cone mirror, as shown in FIG. 8A. The lens has a diameter of 50 mm and an effective focal length of 50 mm. The surfaces of the lens are coated with anti-reflection coatings and have no surface reflections. In other embodiments, the surface reflection of the lens can also be other values.

Figure 8C:
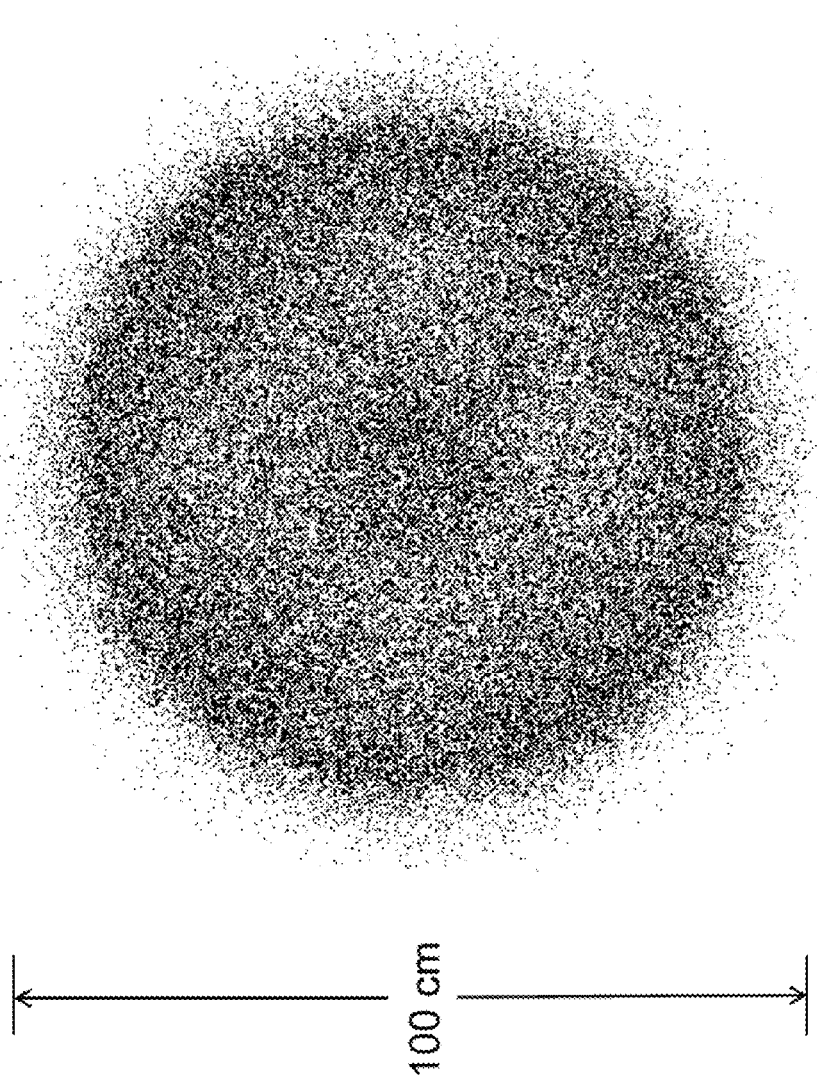
FIG. 8C illustrates an optical flux distribution of the directional light source with a distance of the light emitter and the lens equal to 34 mm.

The following ray tracing simulations help to visualize the performance of the directional light source disclosed in the previous paragraph. The simulated optical flux distribution at a surface that is 5 meters away is shown in FIG. 8C. The distance between the light emitter 8100, and the backside of the lens 8300 is l=34 mm. The simulation shows that at 5 meters away from the light source, almost all the optical power that is originally emitted from the light emitter 8100 is concentrated into a circular area with a diameter of 100 cm. The simulation result also shows that the light beam output from the light source has a uniform optical flux distribution. The beam angle of the concentrated light output from the light source is about 10°.

Figure 8D:
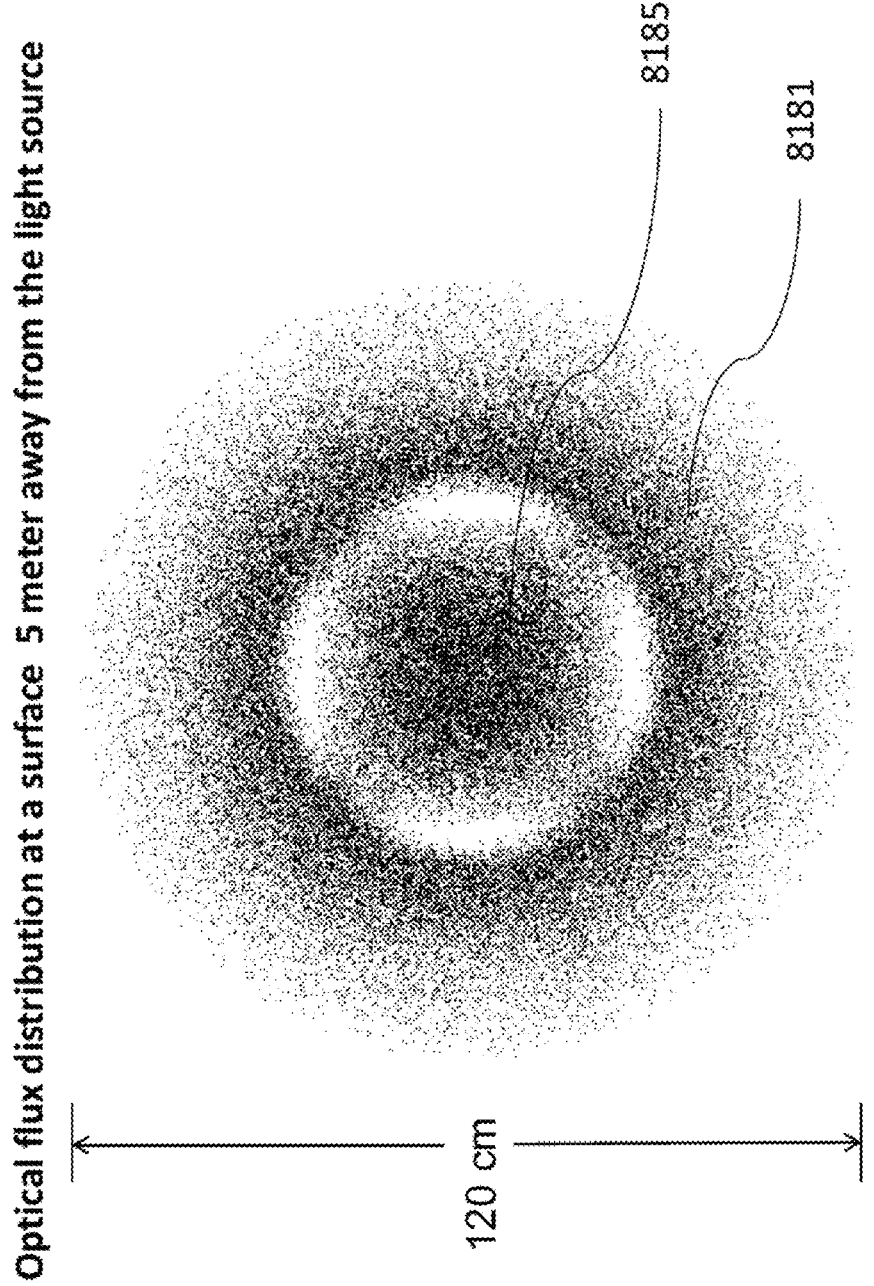
FIG. 8D illustrates an optical flux distribution of the directional light source with a distance of the light emitter and the lens equal to 36 mm.

If the focusing lens 8300 is placed some distance further away from the light emitter 8100 such that the distance between its backside and the light emitter 8100 is l=36 mm. The simulated optical flux distribution at a surface that is 5 meters away is no longer uniform, as shown in FIG. 8D. The simulation shows that almost all of the optical power that originally emitted from the light emitter 8100 is concentrated into a circular area with diameter of 120 cm. However, the illuminated spot is no longer uniform. The center 8185 of the simulated illumination spot shown in FIG. 8D is the projected image of the LED chip from light emitter. The surrounding area 8181 of the simulated illumination spot shown in FIG. 8D is the projected image of emitter's cone mirror image. The only difference between these two simulations is the distance, l, of focusing lens 8300. The ray tracing simulations clearly show that the focusing optical device has to be properly placed so that the uniform illumination can be achieved by the directional light source.

Figure 9A:
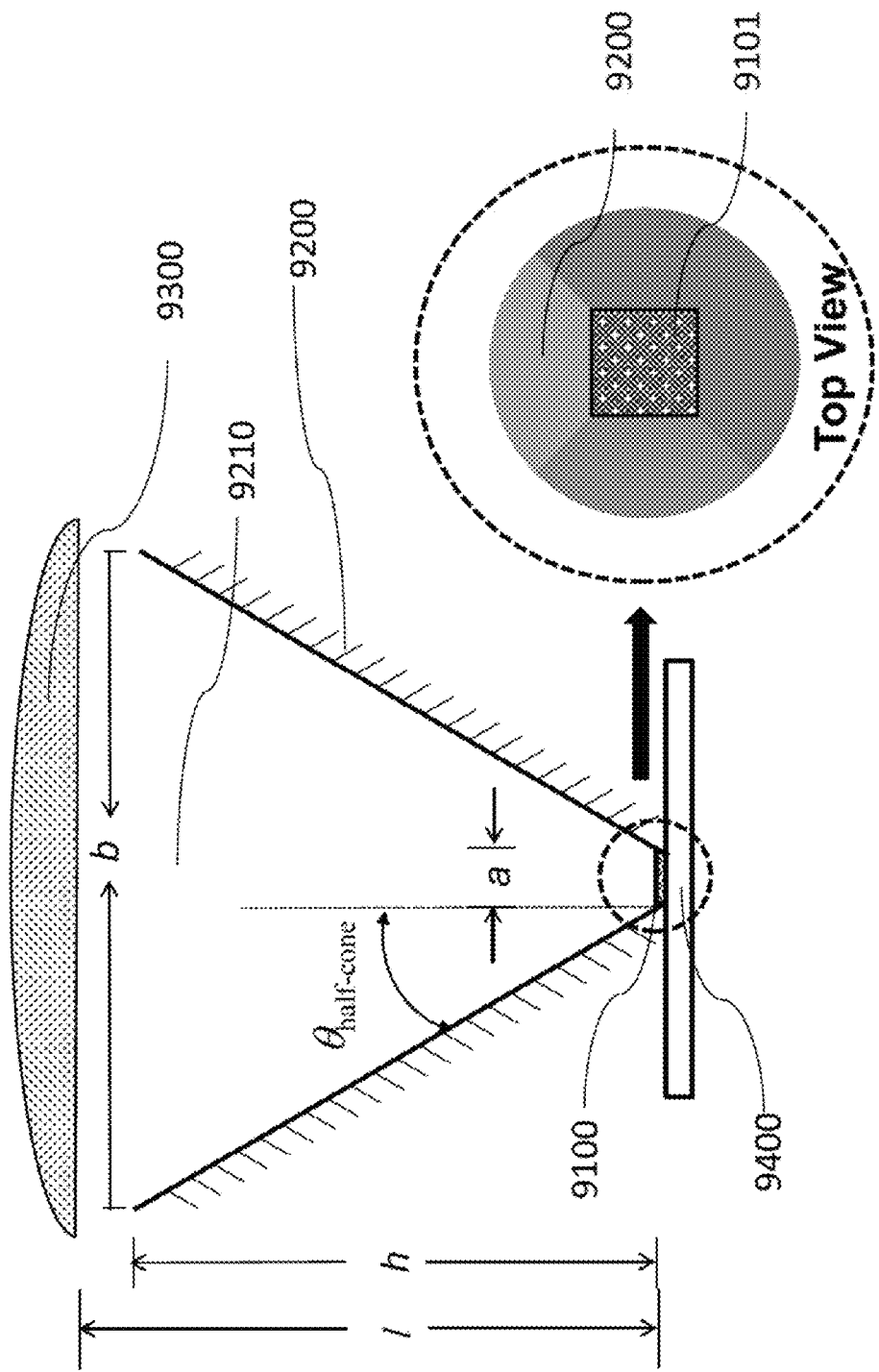
FIG. 9A illustrates an example of a directional light source including an emitter having a square flat emission surface, and a cone mirror with a square base opening and a circular top opening.

Another embodiment of a directional light source with concentrated light output is shown in FIG. 9A. The light emitter 9100 used in this simulation is a LED emitter with a flat emission surface 9101. The emission surface 9101 is square of 3 mm×3 mm. The LED chip has a Lambertion emission pattern. The cone mirror has a square base opening of 3 mm×3 mm. The light emitter 9100 is placed beneath the base of the cone mirror 9200 which has a square base opening and circular top opening 9210. The LED emission surface 9101 is well aligned with cone mirror base opening so that there is no gap between them. The height of the cone mirror is h=34 mm. The circular top opening of the cone mirror has a diameter of b=44 mm. The cone mirror has a reflective surface, such as a silver-coated surface, with a reflectivity of 98%. In some embodiments, the reflectivity of the cone mirror can be other values. A plano-convex aspheric lens is used as the focusing optical device 9300, and is placed on top of the cone mirror, as shown in FIG. 9A. The lens has a diameter of 50 mm and an effective focal length of 50 mm. The distance between the light emitter 9100, and the backside of the lens 9300 is l=36 mm. The surfaces of the lens are coated with anti-reflection coating(s) and have no surface reflections. In some embodiments, the surface reflection of the lens can be other values.

Figure 9B:
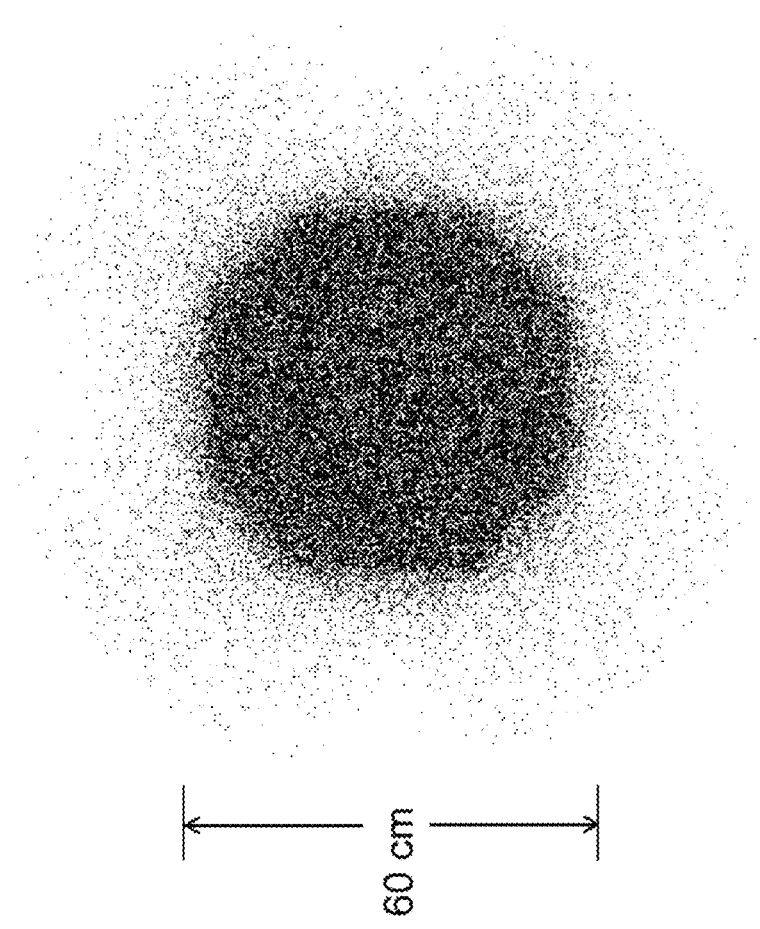
FIG. 9B illustrates an optical flux distribution of the directional light source.

Ray tracing simulation is also performed on the configurations of directional light source illustrated in FIG. 9A. The simulated optical flux distribution at a surface that is 5 meters away is shown in FIG. 9B. The simulation shows that at 5 meters away from the light source, most of the optical power that originally emitted from the light emitter 9100 is concentrated into a circular area with about a diameter of 60 cm. In some embodiments, the focusing lens 9300 can be placed in other positions to achieve a different beam angle of the concentrated light beam from this light source.

Figure 10A:
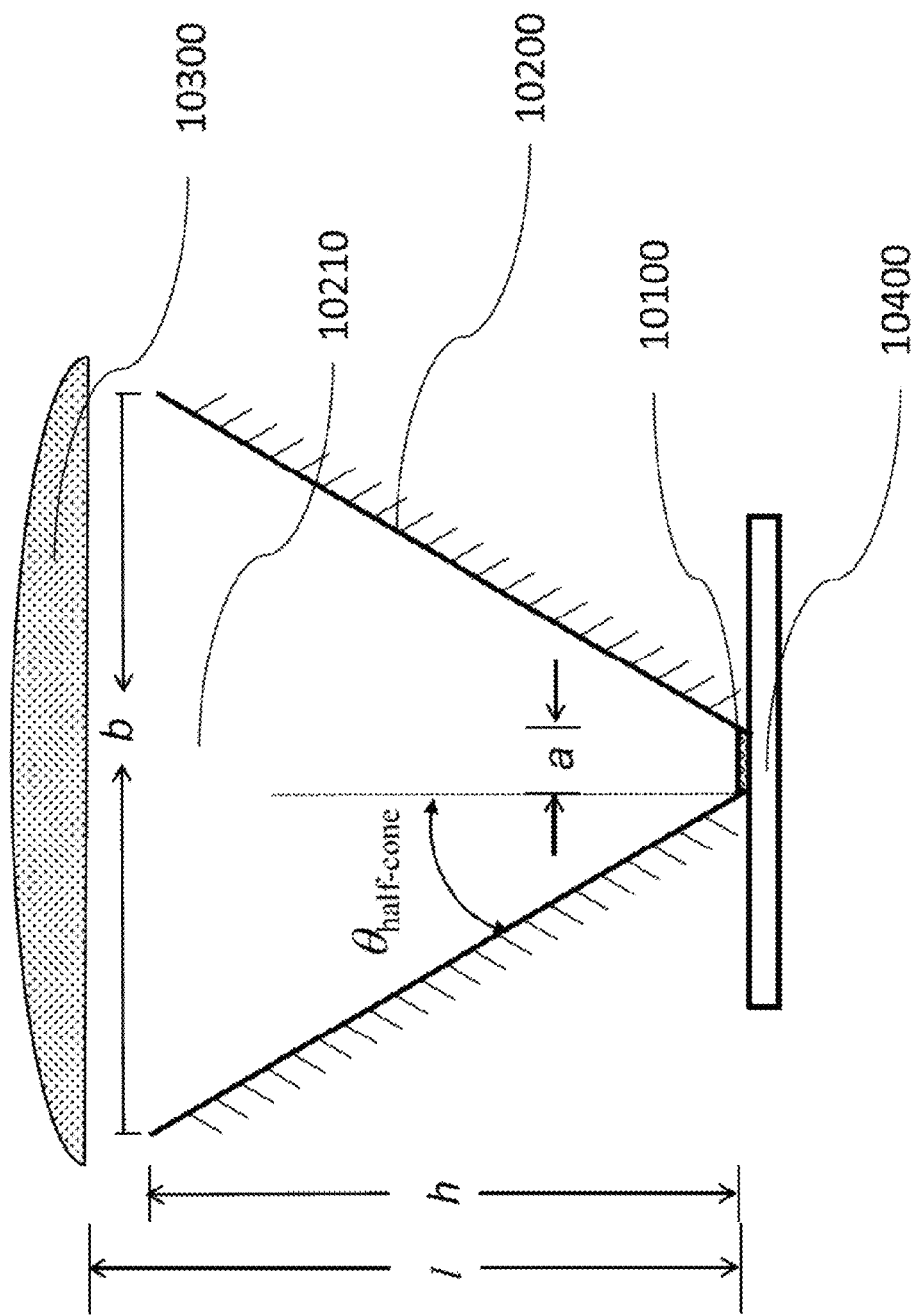
FIG. 10A illustrates an example of a directional light source including an emitter having a round flat emission surface.

Another embodiment of a directional light source with concentrated light output is shown in FIG. 10A. The light emitter 10100 used in this example has a round flat emission surface with a diameter of 4.6 mm, which is the same as the diameter of the cone mirror base. The light emitter 10100 has a Lambertion emission pattern. This light emitter 10100 is located at the base of a concave cone mirror 10200, which has base diameter of a=4.6 mm. In some embodiments, the diameter of the light emitter 10100 can exceed the diameter of the cone mirror base, a. Only light emission emitted by the emission surface directly beneath the cone mirror base opening can enter cone mirror and contribute to the output light of this directional light source. The height of the cone mirror is h=34 mm. The opening of the cone mirror is b=44 mm. The cone mirror has a reflective surface, such as a silver-coated surface, with a reflectivity of 98%. In other embodiments, the reflectivity of the cone mirror can be other values. A plano-convex aspheric lens 10300 is placed on top of the cone mirror, as shown in FIG. 10A. The lens has a diameter of 50 mm and an effective focal length of 50 mm. The distance between the light emitter 10100, and the backside of the lens 10300 is l=34 mm. The surfaces of the lens are coated with anti-reflection coating(s) and have no surface reflections. In some other embodiments, the surface reflectivity of the focusing lens can be other values.

Figure 10B:
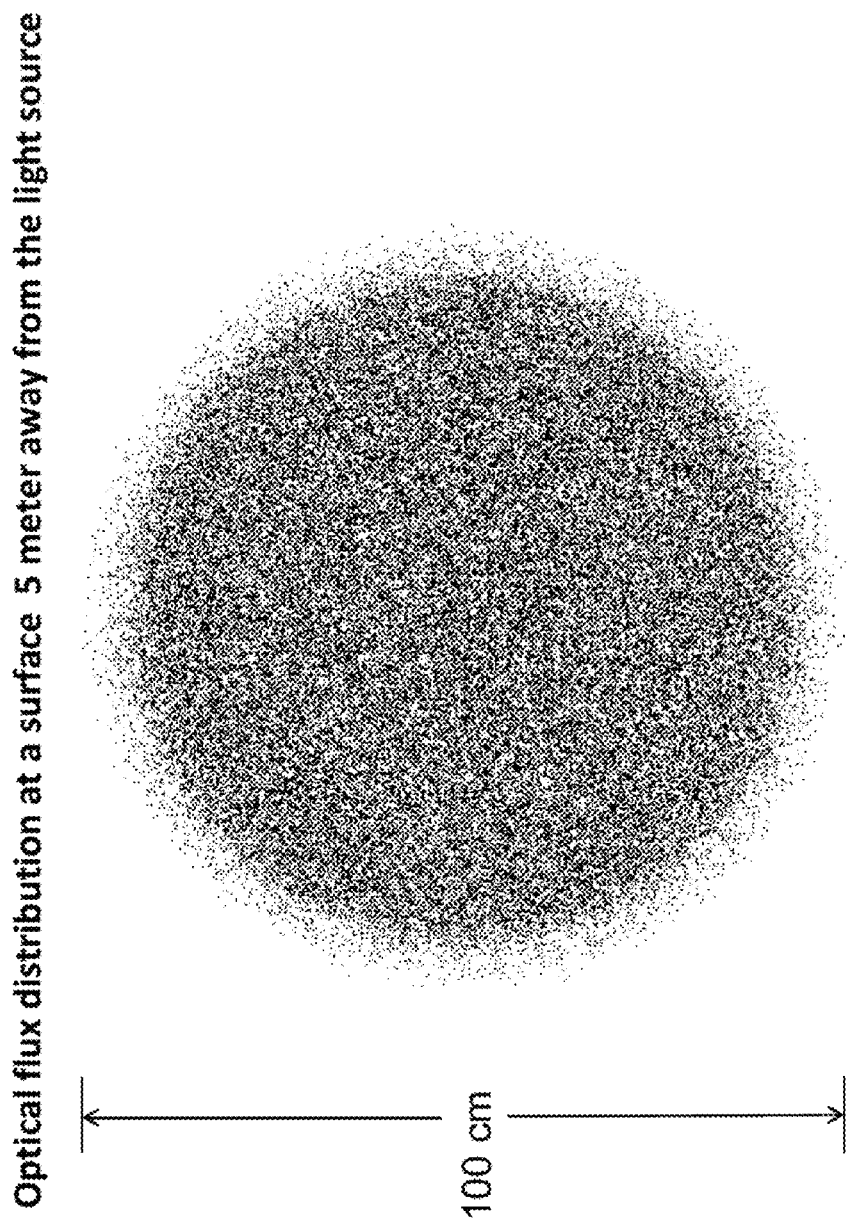
FIG. 10B illustrates an optical flux distribution of the directional light source.

The simulated optical flux distribution at a surface that is 5 meters away is shown in FIG. 10B. The simulation shows that at 5 meters away from the light source, most of the optical power that originally emitted from the light emitter 10100 is concentrated into a circular area with a diameter of 100 cm. The simulation result also shows that the light beam output from the light source has a uniform optical flux distribution. In some other embodiments, other focusing optical devices can be used. In addition, different focal lengths of the focusing optical device can be chosen to achieve different beam angles of concentrated light output.

Figure 11A:
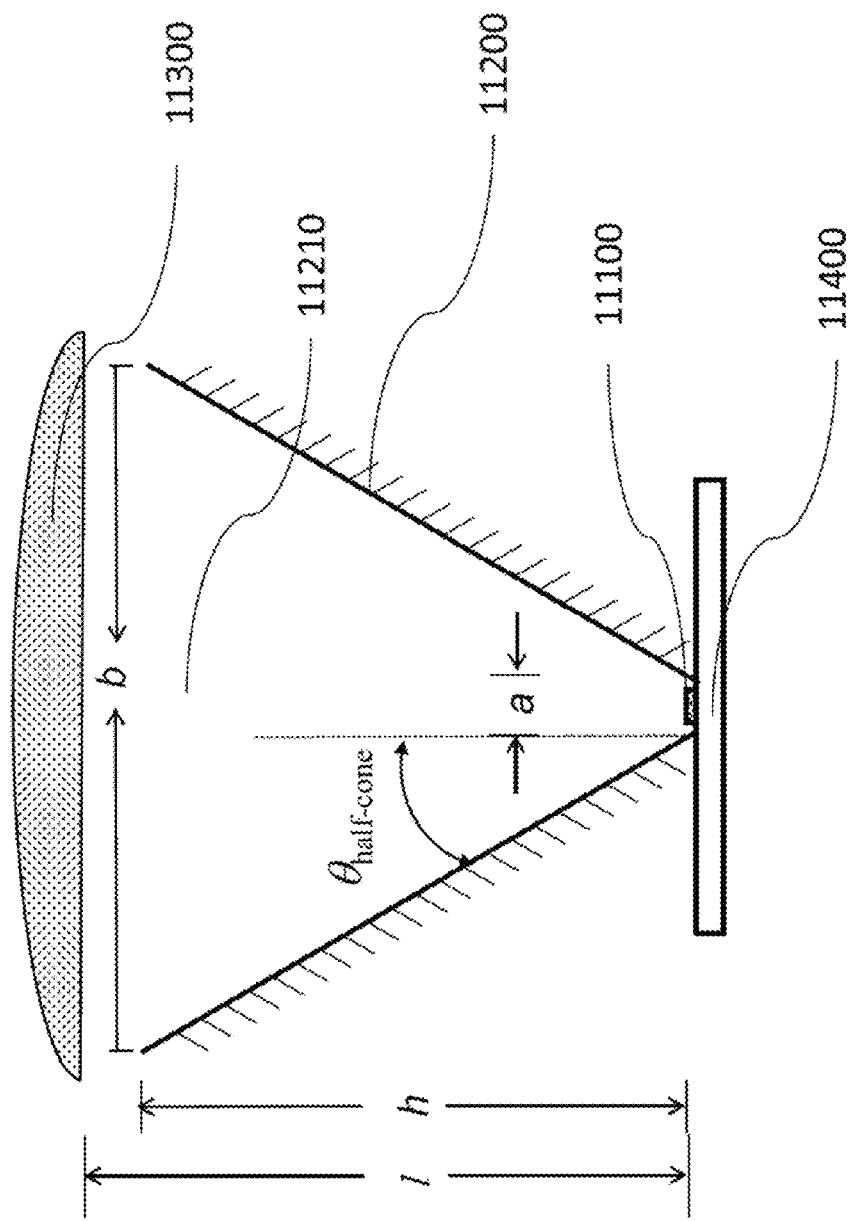
FIG. 11A illustrates an example of a directional light source including an emitter having a square flat emission surface.
Figure 11B:
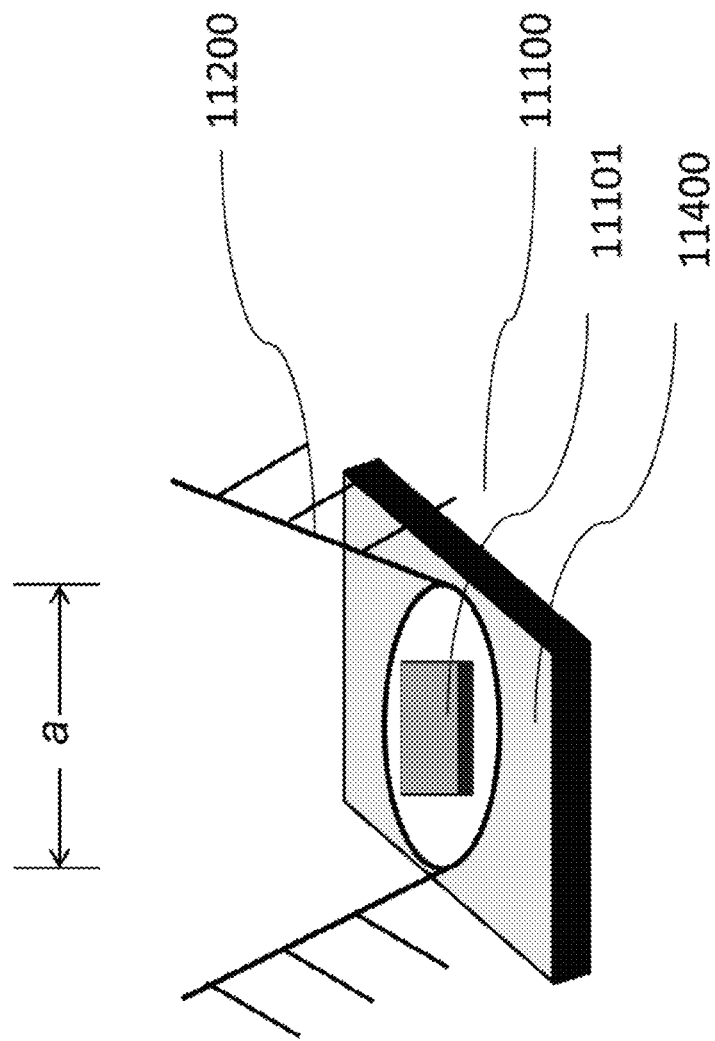
FIG. 11B illustrates the square LED emitter in the directional light source.

Yet another embodiment of a directional light source with concentrated light output is shown in FIG. 11A. The light emitter 11100 used in this embodiment has a square flat emission surface 11101 with dimension of 3 mm×3 mm, as shown in FIG. 11B. The light emitter 11100 has a Lambertion emission pattern. This light emitter 11100 is located inside the base of a concave cone mirror 11200, which has base diameter of a=4.6 mm. The height of the cone mirror is h=34 mm. The opening of the cone mirror is b=44 mm. The cone mirror has a reflective surface, such as a silver coated surface, with reflectivity of 98%. In some embodiments, the reflectivity of the cone mirror can be other values. A plano-convex aspheric lens 11300 is placed on top of the cone mirror, as shown in FIG. 11A. The lens has a diameter of 50 mm and an effective focal length of 50 mm. The distance between the light emitter 11100, and the backside of the lens 11300 is l=34 mm. The surfaces of the lens are coated with anti-reflection coating(s) and have no surface reflections. In some other embodiments, the surface reflectivity of the focusing lens can be other values.

Figure 11C:
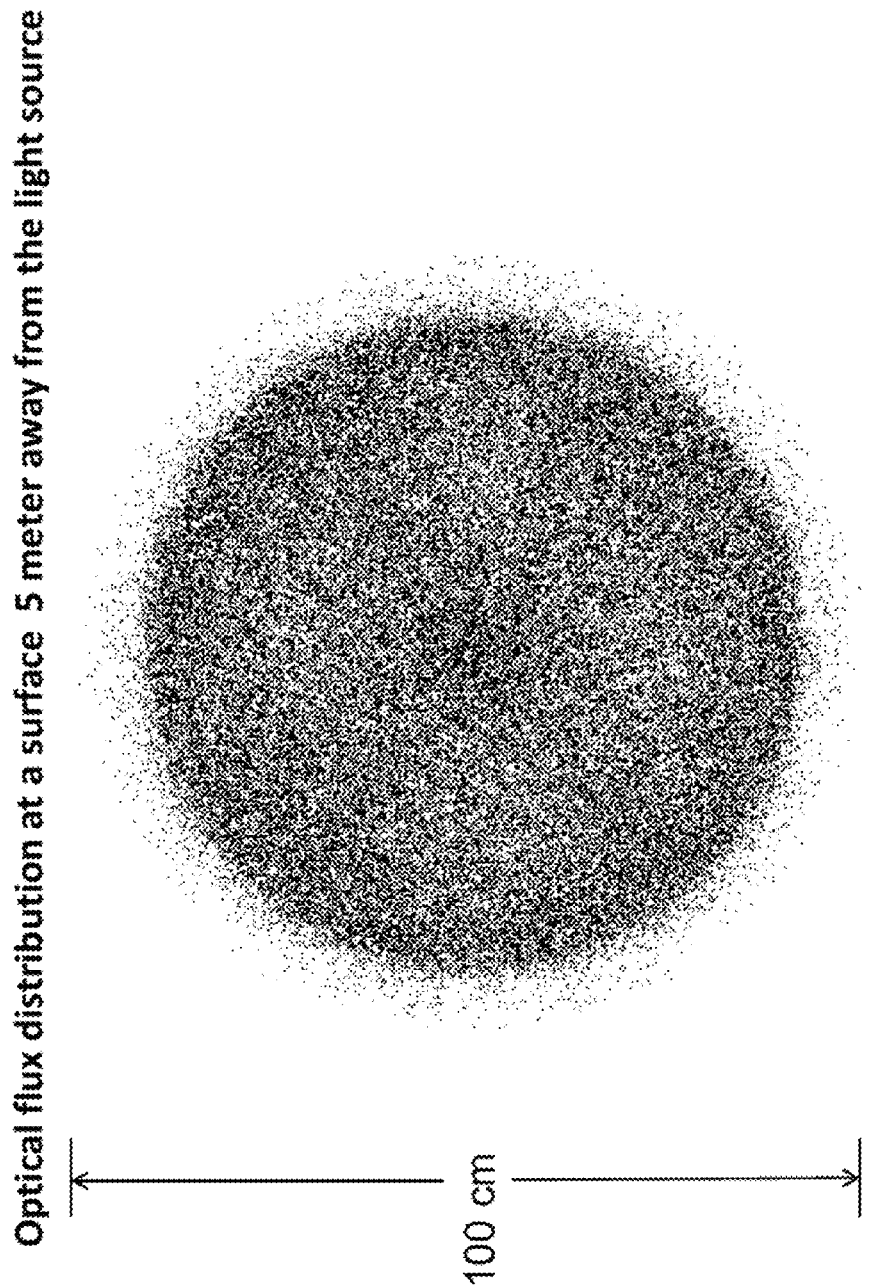
FIG. 11C illustrates an optical flux distribution of the directional light source.

The simulated optical flux distribution at a surface distance of 5 meters is shown in FIG. 11C. The simulation shows that at 5 meters away from the light source, most of optical power that originally emitted from the light emitter 11100 is concentrated into a circular area with a diameter of 100 cm. The simulation result also shows that the light beam output from the light source has a uniform optical flux distribution. In some other embodiments, other focusing optical devices can be used. In addition, different focal lengths of the focusing optical devices can be chosen to achieve different light output beam angles.

Figure 12A:
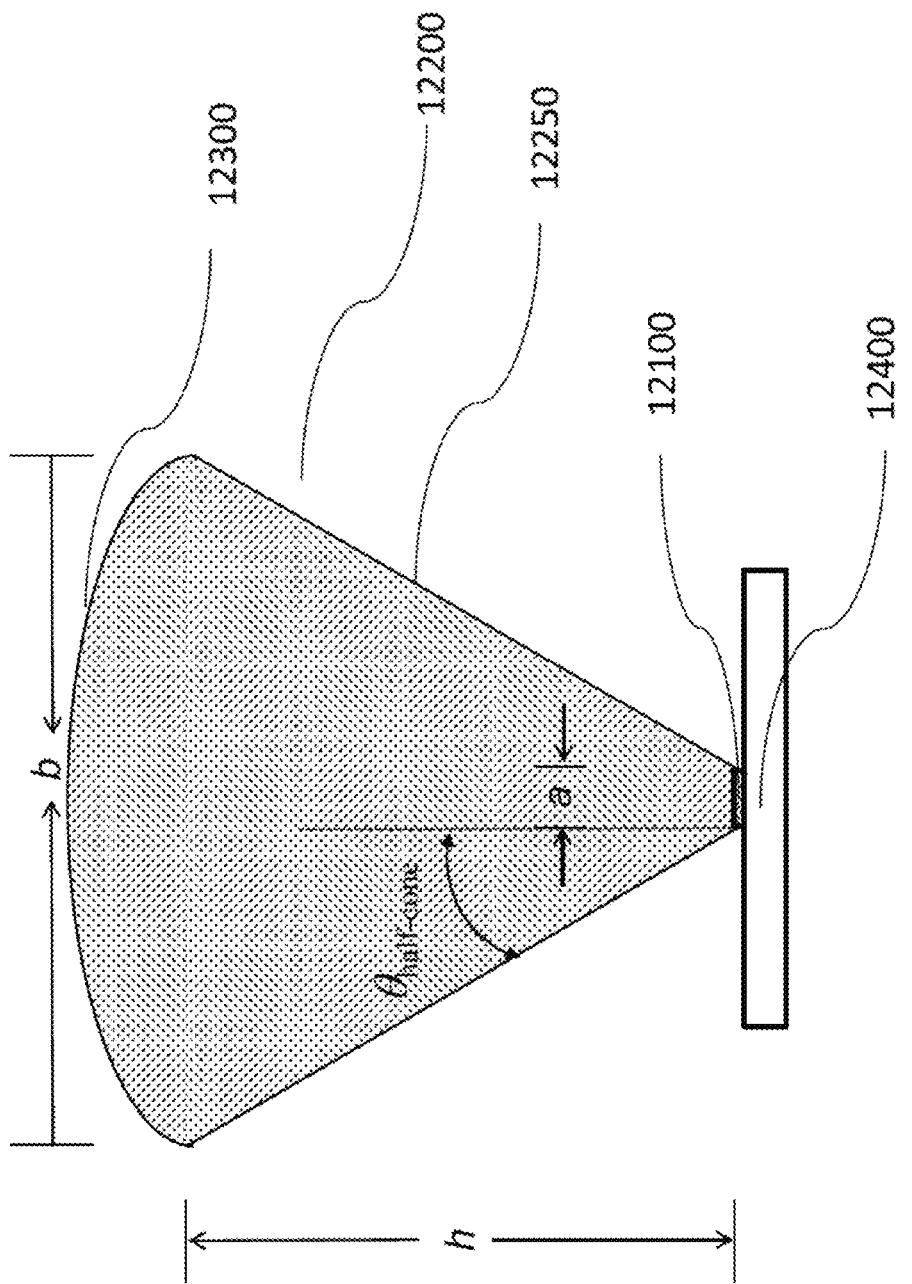
FIG. 12A illustrates an example of a directional light source including a transparent collimation lens.

Still another embodiment of a directional light source with concentrated light output is shown in FIG. 12A. The light emitter 12100 used in this embodiment has a circular flat emission surface with a diameter of 4.4 mm. The light emitter 12100 has a Lambertion emission pattern. A transparent collimation lens 12200 with cone shape, similar to the collimation lens shown in FIG. 7A, is placed on top of the emitter 12100. The sidewall 12250 of the cone-shaped lens can cause total internal reflection so that it can be treated as a reflective cone mirror surface. The base diameter of this collimation lens is a=4.6 mm. The height of the cone is h=34 mm. The diameter of the top surface is b=44 mm. This collimation lens can be, but not limited to, made of silicone, epoxy, glass, plastics or any other transparent material. In this simulation, silicone is the material used to this cone-shaped collimation lens. A spherical curvature can be formed on the top surface 12300 of this cone-shape lens to achieve optical focusing or concentration. In other embodiments, the top surface of this cone-shaped lens can also have aspheric surface curvature or any other shape to achieve optical beam focusing or concentration. An aspheric top surface 12300 is used to achieve light collimation or concentration. The top surface 12300 is coated with anti-reflection coating(s) and the surface reflection is substantially zero. In some other embodiments, the top surface may also not be coated with any anti-reflection coating or coated with other coating to achieve different surface reflections.

Figure 12B:
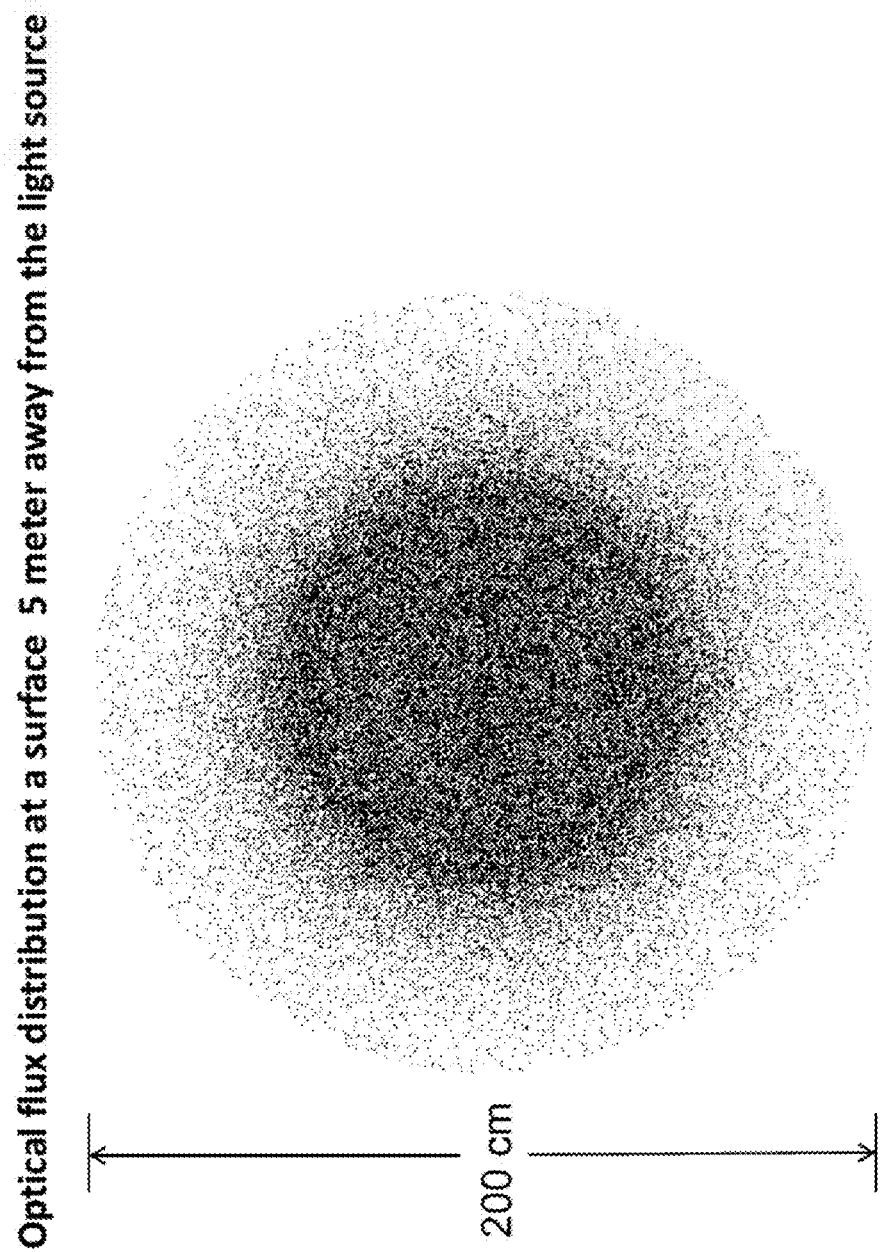
FIG. 12B illustrates an optical flux distribution of the directional light source.

The simulated optical flux distribution at a surface that is 5 meters away is shown in FIG. 12B. The simulation shows that at 5 meters away from the light source, most of optical power that is originally emitted from the light emitter 12100 is concentrated into a circular area with a diameter of 200 cm. In other embodiments, other focusing optical device can also be used. In addition, focusing optical devices with different focal lengths can be chosen to achieve different light output beam angles.

Figure 13:
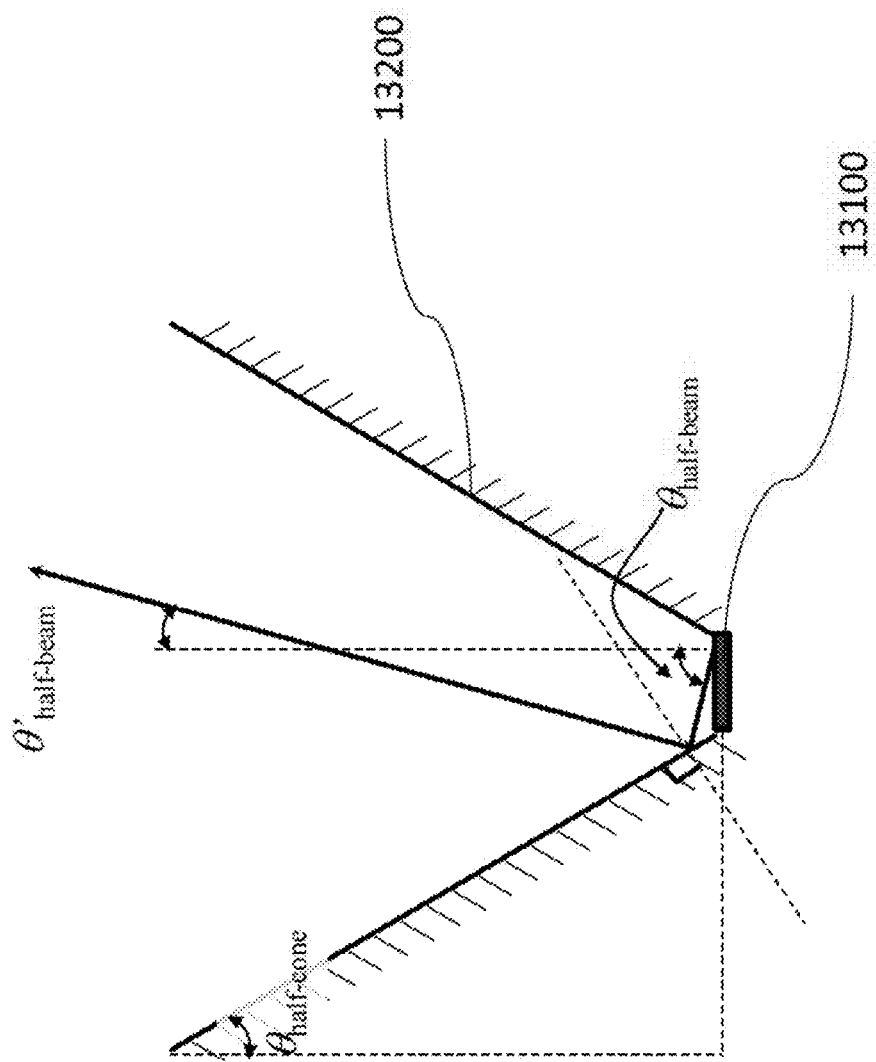
FIG. 13 illustrates an example of a light emitter and a cone mirror.

The cone mirror's slope angle (also referred to as half-cone angle), $\theta_{half\text{-}cone}$ is chosen to satisfy two conditions. First condition is that there is only one reflection or no reflection by the cone mirror to any optical beam emitted by the light emitter. Second condition is that all of the light exiting the top opening of the cone mirror can be collimated or concentrated by the optical focusing device without optical beam cut-off. The condition 1 can be explained using FIG. 13. In FIG. 13, The light emitter 13100 is a point source and has a broad emission pattern. The height of the cone mirror 13200 is much larger than the light emitter dimension. Assuming that one light beam has a half beam angle of $\theta_{half\text{-}beam}$, the light beam will be reflected by the cone mirror surface with slope angle of $\theta_{half\text{-}cone}$. The reflected beam will have a half beam angle of $$\theta'_{half\text{-}beam} = \theta_{half\text{-}beam} - 2 \times \theta_{half\text{-}cone} \qquad (3).$$

The lower limit of the cone mirror slope angle, $\theta_{half\text{-}cone}$, should be chosen in a way that reflected beam has half beam angle no larger than the cone mirror slope angle itself so that there is no second reflection from cone mirror 13100. For a light emitter's light emission pattern with largest beam angle of 180°, (largest half beam angle is $\theta_{half\text{-}beam}=90°$), the smallest cone mirror slope angle should be about $\theta_{half\text{-}cone}=30°$.

The upper limit of the cone mirror slope angle, $\theta_{half\text{-}cone}$ is determined by the focusing optical device at the top opening of the cone mirror. Most of the focusing optical device, such as collimation lens, has a numerical aperture, much less than 1. Any light beam located outside the numeric aperture of the focusing optical device will not be collimated by the device. For example, if the numerical aperture of the focusing optical device is NA=0.6, the beam angle of the light exiting the cone mirror top opening should be no larger than 74°. The light emission exiting the cone mirror top opening has a beam angle similar to the cone mirror's cone angle. Therefore, the cone mirror's slope angle, $\theta_{half\text{-}cone}$, should be no larger about 37°. If the numerical aperture of the focusing optical device is NA=0.7, the beam angle of the light exiting the cone mirror top opening should be no larger than about 90°. The cone mirror's slope angle, $\theta_{half\text{-}cone}$, should be no larger about 45°.

Similarly, the upper limit of the sidewall slope angle for collimation lens, as shown in FIG. 7A, is decided by the numerical aperture of the top curved surface. If the numerical aperture of the top curved surface is NA=0.6, the cone-shape sidewall of the lens should have a slope angle, $\theta_{half\text{-}cone}$, no larger about 37°. If the numerical aperture of the top curved surface is NA=0.7, the cone-shape sidewall of the lens should have a slope angle, $\theta_{half\text{-}cone}$, no larger about 45°.

In one embodiment, the light emitter can include any device or component that has a surface to emit the light in multiple directions with broad angular distribution patterns. The possible choices are, but not limited to, LED chip, LED lamp, packaged LED emitter, light bulb, filament that emits light, plasma that is confined in a certain volume, light emitting surfaces from light-guides, light emitting surfaces from a waveguide(s), light emitting surfaces from fibers or a fiber bundle(s), and any object that can emit light at any spectrum. In addition, single emitting device or a group of multiple emitting devices can be included in the light emitter. Light emitter can also have single or multiple light embittering elements, such as that one LED emitter can have single LED chip or an array of multiple LED chips, to contribute to the total emission from the light emitter. The emitter emission surface can be smaller, larger, or equal to the diameter of the cone mirror base. The emission surface in which light emission enters the cone mirror through the base opening is the effective emission surface of the emitter. To maximize light emission entering the cone mirror, the emitter is placed at the cone mirror base, or as close as possible to the cone mirror base opening.

The light emitter used in the light source fabrication is not limited to the emitters shown in the above examples. Other possible light emitters can be used, as long as the optical emission from the emitter can enter the cone mirror base. For example, the light emitter with a dome-shaped surface, light emitter with a conical surface, light emitter with a roughed surface, light emitter with a surface having an arbitrary morphology, or a light emitter with an irregular or regular surface can be used in the directional light source fabrication. Also, multiple light emitters or multiple light emitting devices located near or at the base of the cone mirror can be used for this directional light source fabrication. Light emitters with rectangular shapes, polygonal shapes, or any other shapes can be used as a light emitter for this directional light source fabrication, as long as the light emission can enter the cone mirror from the base.

Also, there is no limitation of the color or spectrum of the emitted light from the emitter. The light emitter chosen in this directional light source, can be single color or single wavelength light emitter, or can be broad spectrum, such as white light emitter. It can also be the combination of several single color emitting devices. Additionally, the light emitter can emit coherent light or can also emit incoherent light. To achieve a virtual-point light source, the gap between the emission surface of the emitter and the edge of cone mirror base opening, and/or the gap between the multiple emitting devices if more than one emitter inside the cone mirror base, is substantially small. Therefore, the concentrated or collimated optical flux distribution on the illuminated area is substantially uniform.

The optical focusing device used in this directional light source fabrication, can be any focusing device, such as a bi-convex spherical lens, plano-convex spherical lens, bi-convex aspheric lens, plano-convex aspheric lens, Fresnel lens, binary lens, gradient-index lens, spherical interface between different media, aspheric interface between different media. Also, the surface curvature of the optical focusing device is not limited, as long as it provides proper effective focal length to match the light source design need. Optical focusing device with roughed surface, such as aspheric lens with scattering surface, can also be used. The optical focusing device is big enough so that all of the light output from the cone mirror opening can be collected by it. In some embodiments, different optical focusing devices may cause different optical aberrations. As a result, the beam angle and the angular distribution of collimated or concentrated beam may vary, depending on the optical focusing device to be used. For example, an aspheric lens can have a good collimation function on point-like source, while a spherical lens has significant optical aberration for collimation. As a result, a directional light source using an aspheric lens can have a smaller output beam angle compared to a spherical lens.

In one embodiment, a light engine is introduced. The light engine comprises a light emitter emitting light and a cone-shaped mirror having a base opening. The light emitter is disposed at the base opening. One or more first reflection images of the light emitter result from first reflection of the light off the cone-shaped mirror. The light emitter occupies a substantial portion of the base opening so that the light emitter and the first reflection images form a virtual point light source with minimal gap(s) or without any gap between the light emitter and the first reflection images. The cone-shaped mirror has a half-cone angle from about 30 degrees to 45 degrees.

In a related embodiment, the cone-shaped mirror has a height at least three times more than a diameter of the base opening. In another related embodiment, the light emitter includes at least one light emitting diode (LED). In another related embodiment, light emitted from a top opening of the cone-shaped mirror has a beam angle no larger than 90 degrees. In another related embodiment, the cone-shaped mirror has a horizontal cross-section with a circular shape or a polygonal shape or an oval shape or a rectangular shape or a triangular shape. In another related embodiment, the cone-shaped mirror has a top opening with a shape different from a shape of the bottom opening.

In another related embodiment, the cone-shaped mirror has a reflective inside surface. In another related embodiment, the cone-shaped mirror has a height at least five times more than a diameter of the base opening. In another related embodiment, the cone-shaped mirror has a height at least eight times more than a diameter of the base opening. In another related embodiment, a beam angle of the light engine $\theta_{beam}$ is determined by $$\theta_{beam} = 2 \times \tan^{-1}[(h \times \tan(\theta_{cone}/2) \times a)/h];$$

wherein $\theta_{cone}$ is a cone angle of the cone-shaped mirror, h is a height of the cone-shaped mirror, and a is a diameter of the base opening of the cone-shaped mirror. In another related embodiment, the cone-shaped mirror further has a reflective inside surface, a top opening, and an axis passing through a center of the base opening and a center of the top opening, and the intersection of any plane containing the axis and the reflective inside surface has a profile with a constant slope.

In another embodiment, an apparatus is introduced. The apparatus comprises: a cone-shaped mirror having a top opening and a base opening, wherein the base opening is the light receiving end and the top opening is the light exiting end; and a focusing optical device optically coupled to the cone-shaped mirror, wherein substantially all light exiting from the top opening of the cone-shaped mirror reaches the focusing optical device.

In a related embodiment, the cone-shaped mirror has a half-cone angle of at least 30 degrees. In another related embodiment, the cone-shaped mirror has a height at least three times more than a diameter of the base opening. In another related embodiment, the cone-shaped mirror has a height at least five times more than a diameter of the base opening. In another related embodiment, the cone-shaped mirror has a height at least eight times more than a diameter of the base opening. In another related embodiment, the cone-shaped mirror has a horizontal cross-section with a circular shape or a polygonal shape or an oval shape or a rectangular shape or a triangular shape. In another related embodiment, the top opening has a shape different from a shape of the bottom opening. In another related embodiment, the focusing optical device is configured so that light emitted from the focusing optical device has a beam angle of less than 15 degrees. In another related embodiment, the focusing optical device has a surface coated with an anti-reflection coating. In another related embodiment, the focusing optical device is disposed in close proximity of the top opening of the cone-shaped mirror. In another related embodiment, the focusing optical device is disposed in a distance from the top opening of the cone-shaped mirror. In another related embodiment, the focusing optical device includes a bi-convex spherical lens, a plano-convex spherical lens, a concave-convex lens, a bi-convex aspheric lens, a plano-convex aspheric lens, a Fresnel lens, a binary lens, a gradient-index lens, a spherical interface between different media, or an aspheric interface between different media. In another related embodiment, the cone-shaped mirror further has a reflective inside surface and an axis passing through a center of the base opening and a center of the top opening, and the intersection of any plane containing the axis and the reflective inside surface has a profile with a constant slope. In another related embodiment, the cone-shaped mirror has a half-cone angle of less than or equal to 45 degrees.

In another embodiment, a light engine is introduced. The light engine comprises: a light emitter emitting light; a cone-shaped mirror having a base opening, wherein one or more first reflection images of the light emitter result from first reflection of the light off the cone-shaped mirror, and wherein a height of the cone-shaped mirror is at least three times more than a diameter of the base opening; and a focusing optical device optically coupled to the cone-shaped mirror, wherein substantially all light exiting from the top opening of the cone-shaped mirror reaches the focusing optical device. The light emitter occupies a substantial portion of the base opening so that the light emitter and the first reflection images form a virtual point light source with minimal gap(s) between the light emitter and the first reflection images.

In a related embodiment, wherein the cone-shaped mirror has a half-cone angle of at least 30 degrees. In another related embodiment, the light emitter includes at least one light emitting diode (LED). In another related embodiment, the cone-shaped mirror has a half-cone angle of less than or equal to 45 degrees. In another related embodiment, the cone-shaped mirror has a top opening with a shape different than the bottom opening shape. In another related embodiment, the cone-shaped mirror has a horizontal cross-section with an asymmetric shape. In another related embodiment, the cone-shaped mirror has a horizontal cross-section with a circular shape or a polygonal shape or an oval shape or a rectangular shape or a triangular shape. In another related embodiment, the focusing optical device has a focus in close proximity of the light emitter. In another related embodiment, the smallest possible beam angle of the light engine $\theta_{beam}$ is determined by $$\theta_{beam}=2\times\tan^{-1}[H'/(2s')]=2\times\tan^{-1}[H/(2s)];$$

wherein H is a diameter of the virtual point light source, s is a distance between the virtual point light source and the focusing optical device, H' is a diameter of an image of the virtual point light source formed by light traveling through the focusing optical device, and s' is a distance between the image of the virtual point light source and the focusing optical device. In another related embodiment, the cone-shaped mirror has an axis passing through a center of the base opening and a center of a top opening of the cone-shaped mirror, and the intersection of any plane containing the axis and the reflective inside surface has a profile with a constant slope.

In another embodiment, a collimation lens for collimating a light is introduced. The collimation lens comprises: a transparent optical material; a base surface having a diameter to receive the light; a cone-shaped sidewall to reflect a portion of the light; and a curved top surface through which the light travels out of the collimation lens. The collimation lens has a height of the cone shaped sidewall at least three times larger than the diameter of the base surface.

In a related embodiment, the curved top surface has a focus in close proximity of a center of the base surface. In another related embodiment, the height of the cone-shaped sidewall is at least five times larger than the diameter of the base surface. In another related embodiment, the height of the cone-shaped sidewall is at least eight times larger than the diameter of the base surface. In another related embodiment, comprising a reflective coating coated on at least a portion of the cone-shaped sidewall. In another related embodiment, the base surface is a flat surface. In another related embodiment, the base surface is a concave semi-spherical surface. In another related embodiment, a horizontal cross-section of the cone-shaped sidewall has a circular shape or a polygonal shape or an oval shape or a rectangular shape or a triangular shape. In another related embodiment, a boundary of the curved top surface has a different shape than a shape of a boundary of the base surface. In another related embodiment, the collimation lens further comprises an anti-reflection coating coated at the base surface and/or the curved top surface. In another related embodiment, the curved top surface has a spherical curvature, an aspheric curvature, or a Fresnel surface. In another related embodiment, the collimation lens further comprises an axis passing through a center of the base surface and a center of the curved top surface, and the intersection of any plane containing the axis and the cone-shaped sidewall has a profile with a constant slope. In another related embodiment, the cone-shaped sidewall has a half-cone angle of at least 30 degrees. In another related embodiment, the cone-shaped sidewall has a half-cone angle of less than 45 degrees.

In another related embodiment, a light engine is introduced. The light engine comprises the collimation lens and a light emitter emitting light into the collimation lens. The light emitter is optically coupled to and disposed in close proximity to the base surface. One or more first reflection images of the light emitter result from first reflection of the light off the cone-shaped sidewall. The light emitter and the first reflection images form a virtual point light source with minimal gap(s) or without gap between the light emitter and the first reflection images.

In another embodiment, a light engine is introduced. The light engine comprises a light emitter emitting light and a collimation lens. The collimation lens has a cone-shaped sidewall, a base surface and a curved top surface. The height of the cone-shaped sidewall is at least three times more than the diameter of the base surface. The light emitter is optically coupled to and disposed in close proximity to the base surface. One or more first reflection images of the light emitter result from first reflection of the light off a surface of the cone-shaped sidewall. The diameter of the light emitter is substantially close to the diameter of the base surface so that the light emitter and the first reflection images form a virtual point light source with minimal gap(s) or without any gap between the light emitter and the first reflection images.

While the principles of the invention have been described herein, it is to be understood by those skilled in the art that this description is made only by way of example and not as a limitation as to the scope of the invention. For example, a cone mirror or cone-shaped collimation lens with any cross-sectional shape may be utilized to form a directional virtual point source and are understood to be within the scope of the invention. Reference numerals corresponding to the embodiments described herein may be provided in the following claims as a means of convenient reference to the examples of the claimed subject matter shown in the drawings. It is to be understood however, that the reference numerals are not intended to limit the scope of the claims. Other embodiments are contemplated within the scope of the present invention in addition to the exemplary embodiments shown and described herein. Modifications and substitutions by one of ordinary skill in the art are considered to be within the scope of the present invention, which is not to be limited except by the recitations of the following claims.

What is claimed is:

1. A collimation lens for collimating a light, comprising:
a transparent optical material;
a base surface having a diameter to receive the light;
a cone-shaped sidewall to reflect a portion of the light; and
a curved top surface through which the light travels out of the collimation lens, wherein the curved top surface of the collimation lens has a focus in close proximity of a center of the base surface;
wherein the collimation lens has a height of the cone shaped sidewall at least three times larger than the diameter of the base surface.

2. The collimation lens of claim 1, wherein the height of the cone-shaped sidewall is at least five times larger than the diameter of the base surface.

3. The collimation lens of claim 1, wherein the height of the cone-shaped sidewall is at least eight times larger than the diameter of the base surface.

4. The collimation lens of claim 1, further comprising a reflective coating coated on at least a portion of the cone-shaped sidewall.

5. The collimation lens of claim 1, wherein the base surface is a flat surface.

6. The collimation lens of claim 1, wherein the base surface is a concave semi-spherical surface.

7. The collimation lens of claim 1, wherein a horizontal cross-section of the cone-shaped sidewall has a circular shape, a polygonal shape, an oval shape, a rectangular shape or a triangular shape.

8. The collimation lens of claim 1, wherein a boundary of the curved top surface has a different shape than a shape of a boundary of the base surface.

9. The collimation lens of claim 1, further comprising an anti-reflection coating coated at the base surface and/or the curved top surface.

10. The collimation lens of claim 1, wherein the curved top surface has a spherical curvature, an aspheric curvature, or a Fresnel surface.

11. The collimation lens of claim 1, wherein the collimation lens further comprises an axis passing through a center of the base surface and a center of the curved top surface, and the intersection of any plane containing the axis and the cone-shaped sidewall has a profile with a constant slope.

12. The collimation lens of claim 1, wherein the cone-shaped sidewall has a half-cone angle of at least 30 degrees.

13. The collimation lens of claim 1, wherein the cone-shaped sidewall has a half-cone angle of less than 45 degrees.

14. A light engine, comprising:
a collimation lens of claim 1; and
a light emitter emitting light into the collimation lens, the light emitter being optically coupled to and disposed in close proximity to the base surface;
wherein one or more first reflection images of the light emitter result from first reflection of the light off the cone-shaped sidewall; and
wherein the light emitter and the first reflection images form a virtual point light source with minimal gap(s) or without gap between the light emitter and the first reflection images.

15. A light engine, comprising:
a light emitter emitting light; and
a collimation lens having a cone-shaped sidewall, a base surface and a curved top surface, wherein a height of the cone-shaped sidewall is at least three times more than a diameter of the base surface, and the light emitter is optically coupled to and disposed in close proximity to the base surface, and the curved top surface of the collimation lens has a focus in close proximity of a center of the base surface;
wherein one or more first reflection images of the light emitter result from first reflection of the light off a surface of the cone-shaped sidewall, and a diameter of the light emitter is substantially close to the diameter of the base surface so that the light emitter and the first reflection images form a virtual point light source with minimal gap(s) or without any gap between the light emitter and the first reflection images.

16. The light engine of claim 15, wherein the height of the cone-shaped sidewall is at least five times larger than the diameter of the base surface.

17. The light engine of claim 15, wherein the height of the cone-shaped sidewall is at least eight times larger than the diameter of the base surface.

18. The light engine of claim 15, further comprising a reflective coating coated on at least a portion of the cone-shaped sidewall.

19. The light engine of claim 15, wherein a horizontal cross-section of the cone-shaped sidewall has a circular shape, a polygonal shape, an oval shape, a rectangular shape or a triangular shape.

20. The light engine of claim 15, wherein a boundary of the curved top surface has a different shape than a shape of a boundary of the base surface.

21. The light engine of claim 15, further comprising an anti-reflection coating coated at the base surface and/or the curved top surface.

22. The light engine of claim 15, wherein the curved top surface has a spherical curvature, an aspheric curvature, or a Fresnel surface.

23. The light engine of claim 15, wherein the collimation lens further comprises an axis passing through a center of the base surface and a center of the curved top surface, and the intersection of any plane containing the axis and the cone-shaped sidewall has a profile with a constant slope.

24. The light engine of claim 15, wherein the cone-shaped sidewall has a half-cone angle of at least 30 degrees.

25. The light engine of claim 15, wherein the cone-shaped sidewall has a half-cone angle of less than 45 degrees.

26. The light engine of claim 15, wherein the light emitter includes at least one light emitting diode (LED).

* * * * *